United States Patent
Takeshima et al.

(10) Patent No.: US 6,807,673 B2
(45) Date of Patent: Oct. 19, 2004

(54) DISC PLAYER CONTAINING DISCS TO BE PLAYED AND METHOD OF CONTROLLING THE SAME

(75) Inventors: Masaaki Takeshima, Tokyo (JP); Atsushi Michimori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 318 days.

(21) Appl. No.: 09/933,010

(22) Filed: Aug. 21, 2001

(65) Prior Publication Data

US 2002/0021653 A1 Feb. 21, 2002

(30) Foreign Application Priority Data

Aug. 21, 2000 (JP) ........................................ 2000/249405

(51) Int. Cl.⁷ .............................................. G11B 17/12
(52) U.S. Cl. ...................................................... 720/706
(58) Field of Search ........................................ 369/191

(56) References Cited

U.S. PATENT DOCUMENTS

| | | |
|---|---|---|
| 4,610,008 A | 9/1986 | Ishibashi et al. |
| 5,982,720 A * | 11/1999 | Takemasa et al. ........ 369/30.78 |
| 6,262,963 B1 * | 7/2001 | Nakamura et al. .......... 369/191 |

FOREIGN PATENT DOCUMENTS

| | | |
|---|---|---|
| JP | 2813174 | 8/1998 |
| WO | 0079527 | 12/2000 |

OTHER PUBLICATIONS

German Office Action dated Feb. 17, 2004.

* cited by examiner

Primary Examiner—George J. Letscher
(74) Attorney, Agent, or Firm—Birch, Stewart, Kolasch & Birch, LLP

(57) ABSTRACT

A disc player for containing a plurality of discs and playing back a disc selected therefrom, comprises a disc holding/separating mechanism which holds the plurality of discs concentrically and which separates the selected disc from the remaining discs to form a first space below the selected disc; a turntable; an optical pickup; a turntable support mechanism which supports the turntable and which moves between an outside of the discs held by the disc holding/separating mechanism and the first space; a disc carrier mechanism which holds and conveys the selected disc between the disc holding/separating mechanism and the turntable; a clamper which secures the selected disc to the turntable; a clamper support mechanism which supports the clamper and which moves between an outside of the discs held by the disc holding/separating mechanism and a second space formed above the selected disc; and a control mechanism which controls motions of the turntable support mechanism and the clamper support mechanism.

16 Claims, 25 Drawing Sheets

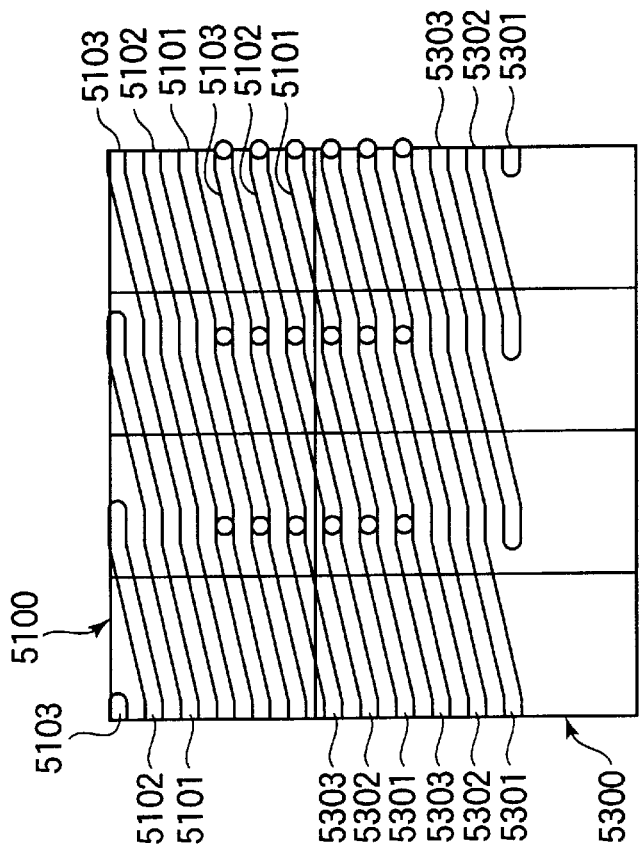
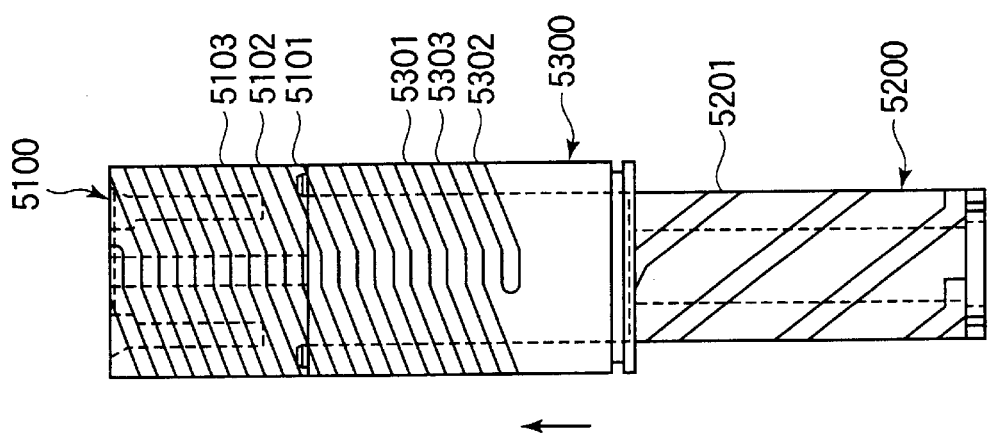
FIG.5B
FIG.5A

DISC PLAYER CONTAINING DISCS TO BE PLAYED AND METHOD OF CONTROLLING THE SAME

BACKGROUND OF THE INVENTION

The present invention relates to a disc player which is capable of containing a plurality of discs and plays back a disc selected therefrom and a method of controlling the disc player.

FIGS. 20A and 20B are diagrams showing a prior art disc player disclosed in Japanese Patent Publication No. 2,813,174 published on Dec. 22, 1998. FIG. 20A shows an exploded perspective view of a disc holding/separating section 90 for holding a plurality of discs 91 and 91a, and FIG. 20B shows a side view showing a playback section 92. Referring to FIGS. 20A and 20B, when a disc 91a to be played back is selected from the plurality of discs, a tray 93a on which the selected disc 91a is placed is separated from the remaining trays 93 by a separating and positioning mechanism (not shown), thereby creating upper and lower spaces 94a and 94b above and below the selected disc 91a. A playback base 95 together with a clamper arm 98a is lifted up to an elevation corresponding to the tray 93a and rotates about an axis 95a to move the turntable 96 and an optical pickup 97 into the upper space 94a and to move a clamper 98 mounted on the clamper arm 98a into the lower space 94b. After that, the clamper arm 98a swings upward about a shaft 98b in a direction Q to separate the selected disc 91a from the tray 93a and urges it against the turntable 96. Subsequently, the turntable 96 is rotated to play back the selected disc 91a.

In the above-described prior art disc player, the playback base 95 is provided with both the turntable 96 and the clamper 98, which are simultaneously conveyed into the upper space 94a and the lower space 94b, respectively. Therefore, the upper space 94a and the lower space 94b must be simultaneously secured above and below the selected disc 91a. Accordingly, a thickness of the disc holding/separating section 90 is increased, which results in an increased thickness of the prior art disc player.

SUMMARY OF THE INVENTION

It is an object of the present invention to provide a disc player with a reduced thickness, and a method of controlling the disc player.

According to the present invention, a disc player which is capable of containing a plurality of discs and plays back a disc selected from the plurality of discs, comprises a disc holding/separating mechanism which holds the plurality of discs concentrically and which separates the selected disc from the remaining discs to form a first space below the selected disc; a turntable; a pickup which reads out data recorded on the selected disc which is placed on the turntable; a turntable support mechanism which supports the turntable and which moves between an outside of the plurality of discs held by the disc holding/separating mechanism and the first space; a disc carrier mechanism which holds and conveys the selected disc between the disc holding/separating mechanism and the turntable; a clamper which secures the selected disc to the turntable; a clamper support mechanism which supports the clamper and which moves between an outside of the plurality of discs held by the disc holding/separating mechanism and a second space formed above the selected disc which is placed on the turntable; and a control mechanism which controls motion of the turntable support mechanism and the clamper support mechanism.

Further, it is preferable that when the selected disc is placed on the turntable, a center of the turntable is positioned off a central axis of the plurality of discs held by the disc holding/separating mechanism. Furthermore, when the selected disc is placed on the turntable, a center of the turntable may be positioned on a central axis of the plurality of discs held by the disc holding/separating mechanism. Moreover, the pickup may be mounted on the turntable support mechanism.

The disc player may further comprise a sub-base which supports the turntable support mechanism. The turntable support mechanism may include a first pole provided on the sub-base; and a playback base which is supported on the first pole so as to be rotatable about the first pole, wherein the turntable is mounted on the playback base.

Further, the disc player may further comprise a sub-base which supports the clamper support mechanism. The clamper support mechanism may include a second pole provided on the sub-base; and a clamper arm which is supported on the second pole so as to be rotatable about the second pole, wherein the clamper is mounted on the clamper arm.

Furthermore, the disc player may further comprise a base plate; a sub-base which is supported on the base plate and which supports the turntable support mechanism and the clamper support mechanism; a vibration absorbing member which is interposed between the base plate and the sub-base; a lock member which is movably provided on the base plate and which is engaged with the sub-base when locking the sub-base in place; and a lock member moving mechanism which causes the lock member to lock the sub-base when the clamper does not secure the selected disc to the turntable and which causes the lock member to unlock the sub-base when the clamper secures the selected disc to the turntable.

Moreover, the control mechanism may include a first motor; a cam gear which has a cam groove and which rotates by driving power supplied from the first motor; and a moving member which includes an engagement pin for engaging with the cam groove of the cam gear and which moves by driving power fed through the cam gear; wherein both the turntable support mechanism and the clamper support mechanism engage with the moving member and moves in turn by driving power fed through the moving member.

The disc player may further comprise a second motor; wherein both the disc carrier mechanism and the lock member moving mechanism operate by driving power supplied from the second motor. The control mechanism may include a clutch mechanism which is capable of transmitting driving power from the second motor; a cam gear which has a cam groove and which rotates by driving power supplied through the clutch mechanism from the second motor; and a moving member which includes an engagement pin for engaging the cam groove of the cam gear and which moves by driving power fed through the cam gear; wherein the turntable support mechanism and the clamper support mechanism engage with the moving member and moves in turn by driving power fed through the moving member.

According to the present invention, a method of controlling a disc player comprising the steps of: forming a first space below a disc selected from a plurality of discs which are concentrically held by a disc holding/separating mechanism of the disc player; moving a turntable mounted on a turntable support mechanism of the disc player from an outside of the plurality of discs held by the disc holding/separating mechanism to the first space; conveying the selected disc from the disc holding/separating mechanism onto the turntable by a disc carrier mechanism of the disc player; moving a clamper supported on a clamper support mechanism of the disc player from an outside of the plurality of discs held by the disc holding/separating mechanism to a second space formed above the selected disc which is placed on the turntable; and securing the selected disc to the turntable by the clamper.

The method may further comprise the steps of: raising the clamper from the selected disc which is placed on the turntable to the second space; moving the clamper from the second space to the outside of the plurality of discs held by the disc holding/separating mechanism; conveying the selected disc from the turntable to the disc holding/separating mechanism; and moving the turntable from the first space to the outside of the plurality of discs held by the disc holding/separating mechanism.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A and 5B are a side view of a first guide member to a third guide member of the disc holding/separating mechanism and an unfolded view of the first guide member and the third guide member when they are coupled to each other;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
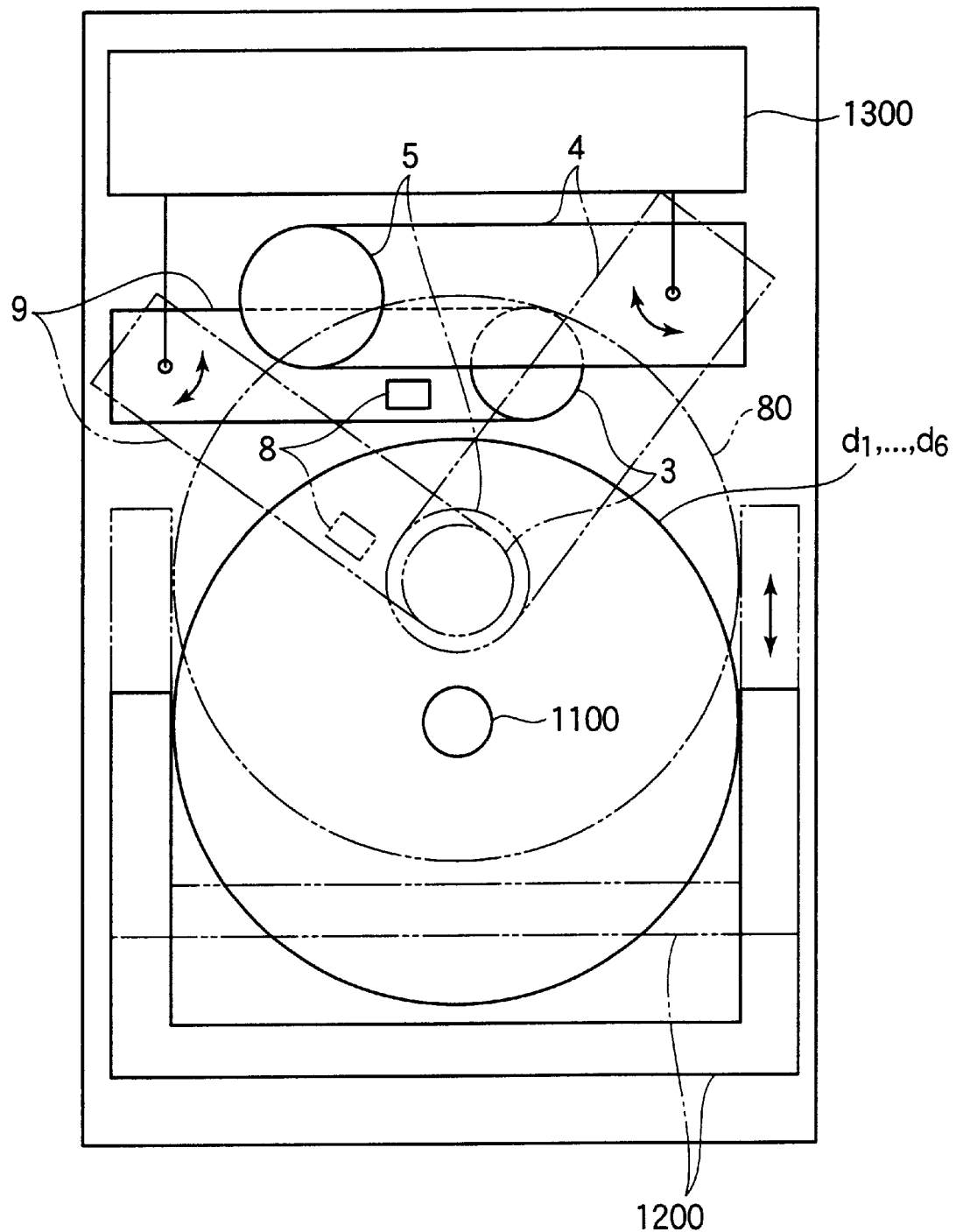
FIG. 1 is a conceptual diagram illustrating a schematic plan view of a disc player according to the first embodiment of the present invention.

FIG. 1 is a conceptual diagram illustrating a schematic plan view of a disc player according to the first embodiment of the present invention.

Referring to FIG. 1, the disc player according to the first embodiment comprises a disc holding/separating mechanism 1100 which is capable of holding a plurality of discs d1 to d6 concentrically and separating a selected disc to be played back from the remaining discs. The disc player also comprises a turntable 3, a pickup 8 which reads out data recorded on the selected disc 80 which is placed on the turntable 3, and a playback base 9 which supports the turntable 3 and the pickup 8 and which moves between an outside and an inside of the plurality of discs d1 to d6 held by the disc holding/separating mechanism 1100. The disc player further comprises a disc carrier mechanism 1200 which holds and conveys the selected disc 80 between the disc holding/separating mechanism 1100 and the turntable 3. The disc player further comprises a clamper 5 which secures the selected disc 80 to the turntable 3, and a clamper arm 4 which supports the clamper 5 and which moves between an outside and an inside of the plurality of discs d1 to d6 held by the disc holding/separating mechanism 1100. The disc player further comprises a control mechanism 1300 which controls motions of the playback base 9 and the clamper arm 4.

1. Disc Holding/Separating Mechanism

Figure 2:
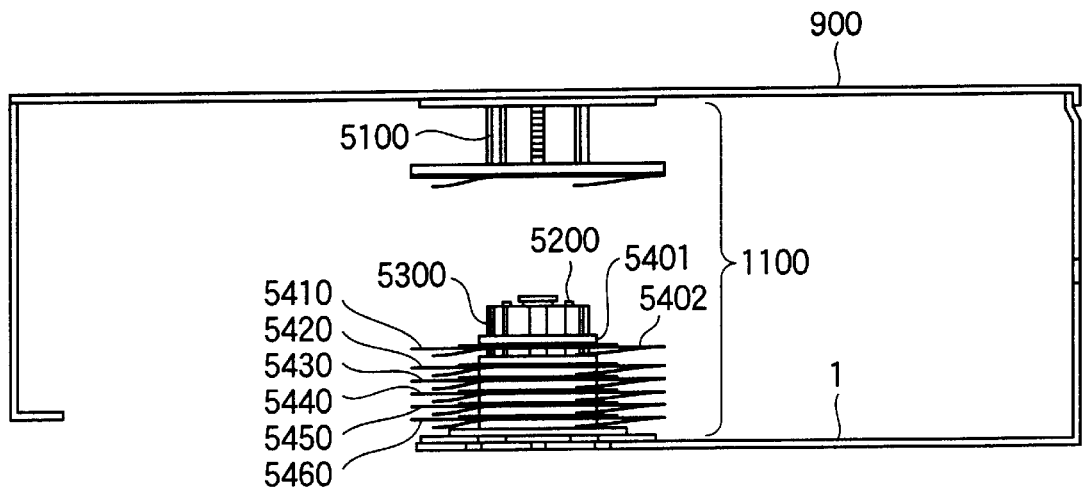
FIG. 2 is a schematic side view of a disc holding/separating mechanism when it holds no disc.
Figure 3:
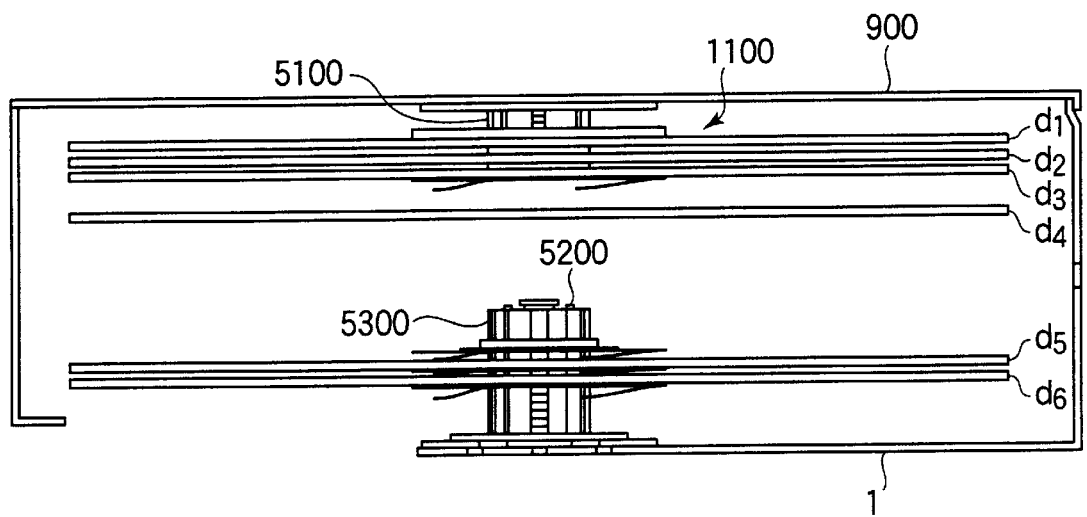
FIG. 3 is a schematic side view of a disc holding/separating mechanism when it holds a plurality of discs concentrically and separates a selected disc to be played back from the remaining discs.

FIG. 2 is a schematic side view of the disc holding/separating mechanism 1100 when it holds no disc. Further, FIG. 3 is a schematic side view of the disc holding/separating mechanism 1100 when it holds six discs d1 to d6 concentrically and separates a selected disc 80 (or d3) from the remaining discs. The disc holding/separating mechanism 1100 is the same as that disclosed in our prior International Application No. PCT/JP99/03316 (WO 00/79527 A1 published on Dec. 28, 2000).

Referring to FIG. 2, the disc holding/separating mechanism 1100 includes a cylindrical first guide member 5100 which is mounted on a top plate 900, a cylindrical second guide member 5200 which is mounted on a base plate 1, and a cylindrical third guide member 5300 which is supported by the second guide member 5200 so as to be vertically movable. The disc holding/separating mechanism 1100 also includes a first spacer to a sixth spacer 5410, 5420, 5430, 5440, 5450 and 5460, each of which can hold a disc around a center hole of the disc, and which are supported by the first guide member 5100 or the third guide member 5300 so as to be vertically movable.

Figure 4A:
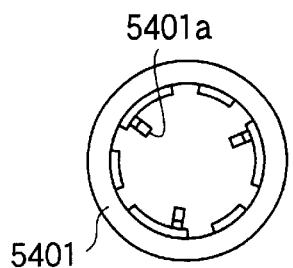
FIGS. 4A and 4B are plan views respectively showing a disc rack on which a disc is placed and a leaf spring member which presses down a lower disc against the lower disc rack.
Figure 4B:
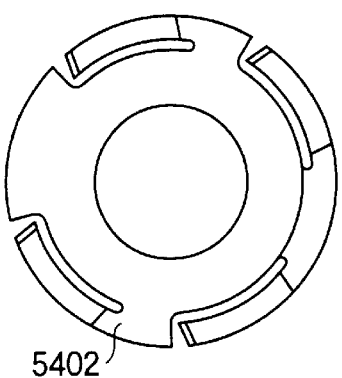

Each spacer 5410, 5420, 5430, 5440, 5450 and 5460 includes a disc rack 5401 on which a disc is placed and a leaf spring member 5402 which is connected to the lower surface of the disc rack 5401. FIGS. 4A and 4B are plan views respectively showing the disc rack 5401 and the leaf spring member 5402. The disc rack 5401 has projections 5401a which is engaged with below-described spiral grooves formed on an outer surface of the first guide member 5100 and spiral grooves formed on the third guide member 5300. The leaf spring member 5402 has a function of pressing down a lower disc against the lower disc rack.

The discs d1 to d6 are supported by the first spacer to the sixth spacer 5410, 5420, 5430, 5440, 5450 and 5460 while the respective guide members 5100, 5200 and 5300 pass through the center holes of the spacers. The disc holding/separating mechanism 1100 is capable of holding six discs d1 to d6. When a selected disc 80 is to be played back, a playback section including a turntable 3 and a clamper 5 is inserted toward a space between the first guide member 5100 and the second or the third guide member 5200 or 5300.

Figure 6B:
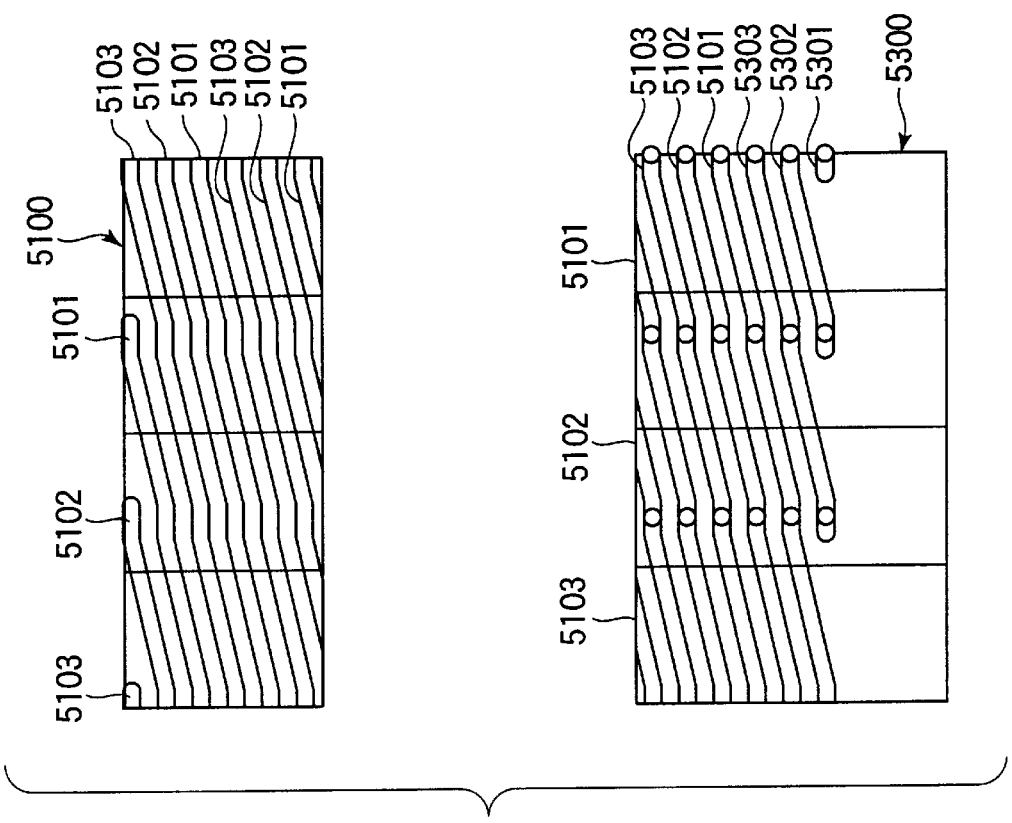
FIGS. 6A and 6B are a side view of the first guide member to the third guide member and an unfolded view of the first guide member and the third guide member when they are separated to each other.
Figure 6A:
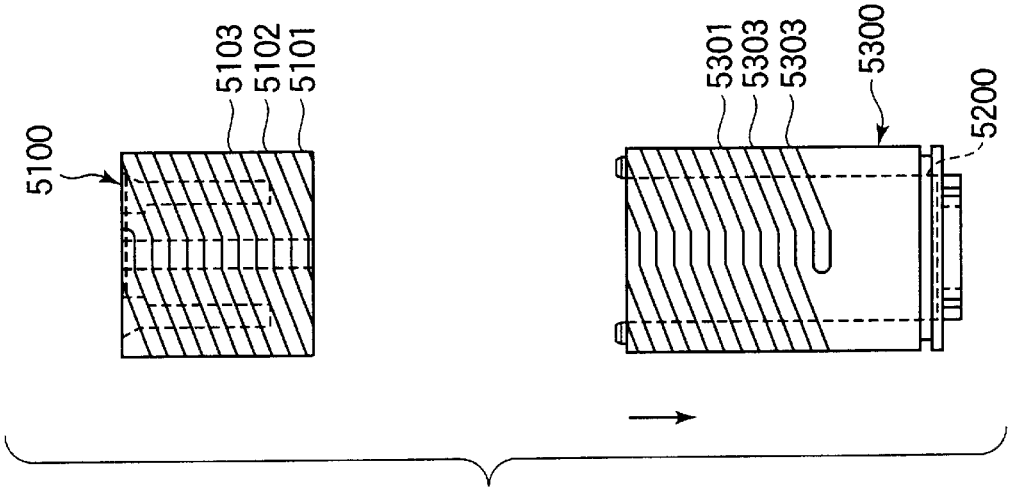
Figure 7A:
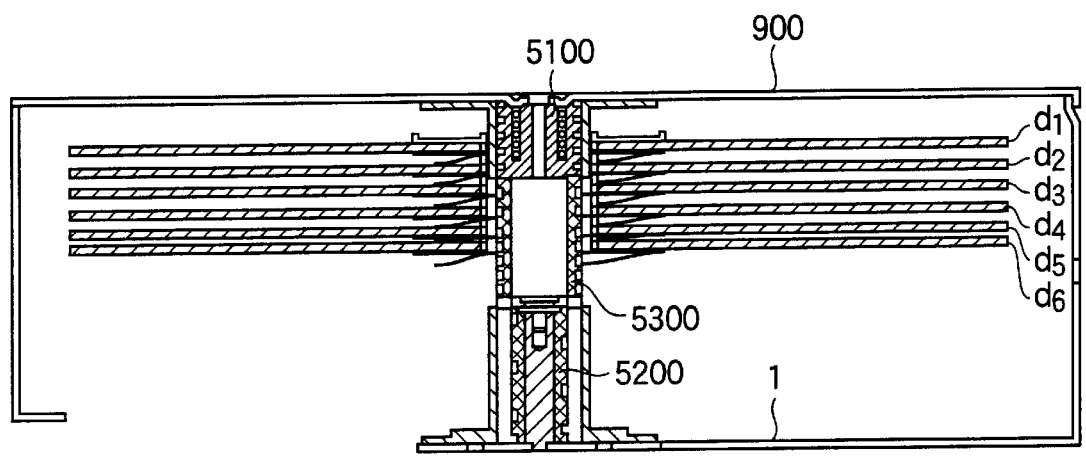
FIGS. 7A and 7B are a cross sectional view of the disc holding/separating mechanism and an unfolded view of the first guide member and the third guide member when they are coupled to each other and the discs are raised upward.
Figure 7B:
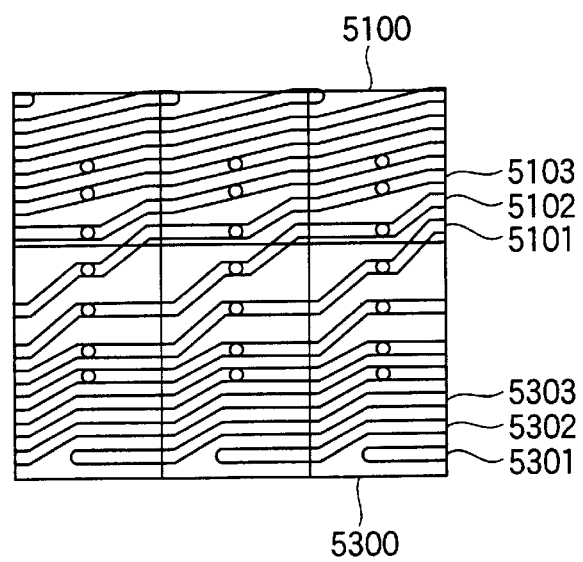
Figure 8A:
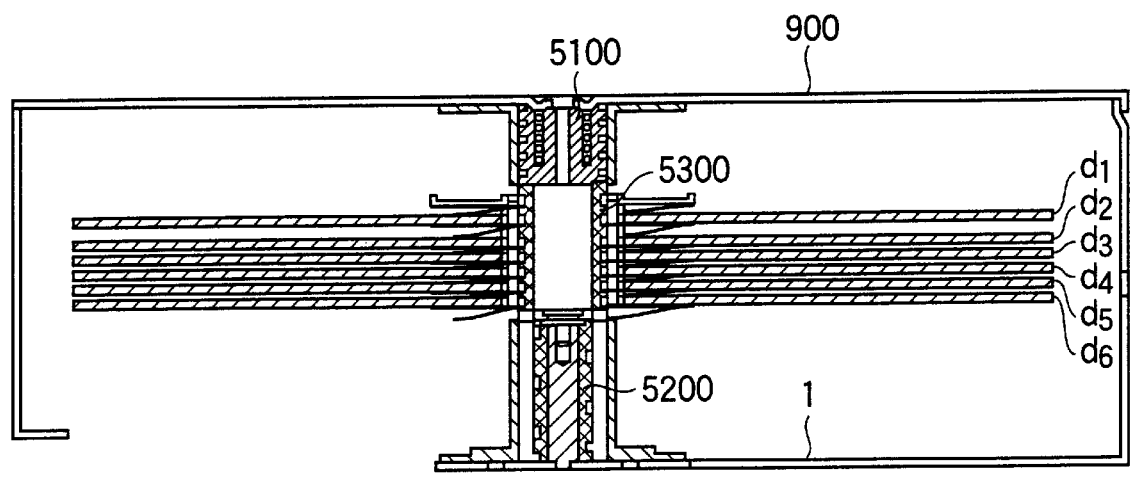
FIGS. 8A and 8B are a cross sectional view of the disc holding/separating mechanism and an unfolded view of the first guide member and the third guide member when they are coupled to each other and the discs are brought downward.
Figure 8B:
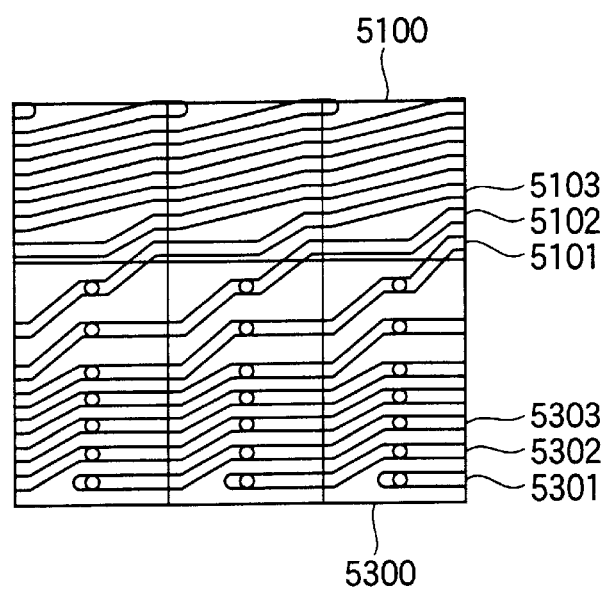
Figure 9A:
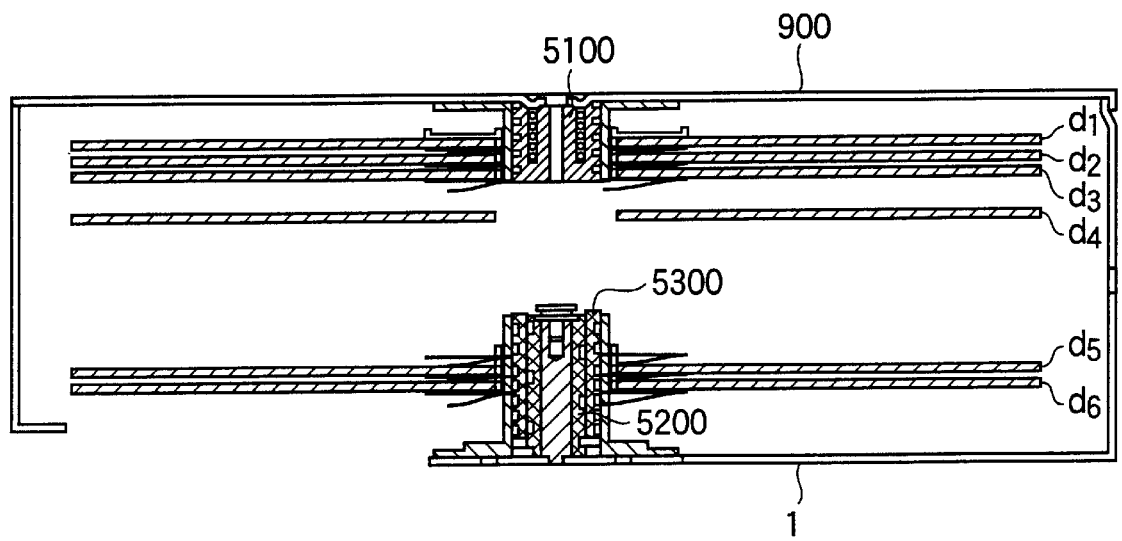
FIGS. 9A and 9B are a cross sectional view of the disc holding/separating mechanism and an unfolded view of the first guide member and the third guide member when they are separated to each other and a selected disc is separated from the remaining discs.
Figure 9B:
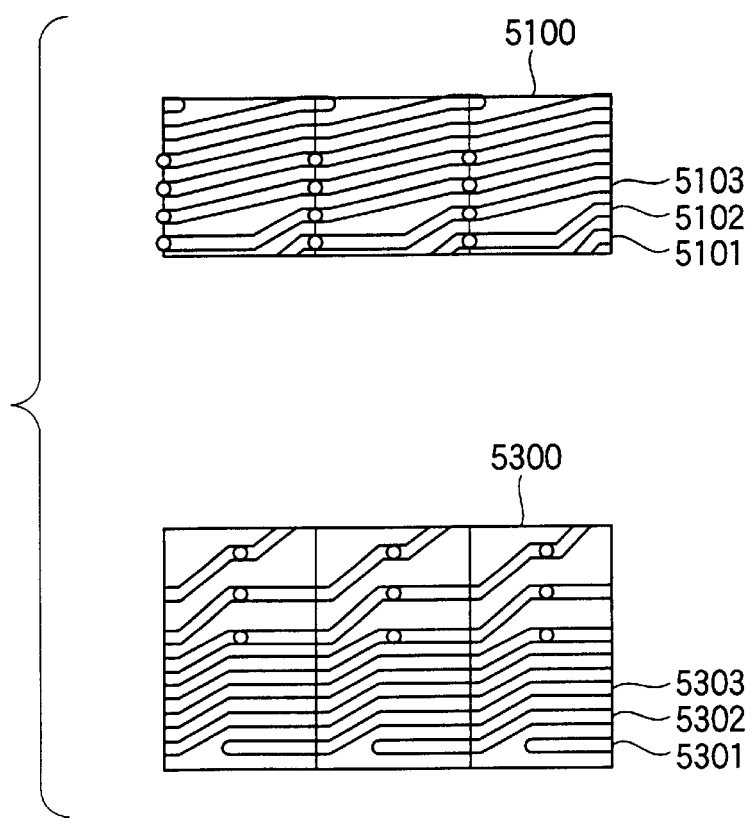

FIGS. 5A and 5B are a side view of the first guide member to the third guide member 5100, 5200 and 5300 of the disc holding/separating mechanism 1100 and an unfolded view of the first guide member 5100 and the third guide member 5300 when they are coupled to each other, FIGS. 6A and 6B are a side view of the first guide member to the third guide member 5100, 5200 and 5300 and an unfolded view of the first guide member 5100 and the third guide member 5300 when they are separated to each other. Further, FIGS. 7A and 7B are a cross sectional view of the disc holding/separating mechanism 1100 and an unfolded view of the first guide member 5100 and the third guide member 5300 when they are coupled to each other and the discs d1 to d6 are raised upward, and FIGS. 8A and 8B are a cross sectional view of the disc holding/separating mechanism 1100 and an unfolded view of the first guide member 5100 and the third guide member 5300 when they are coupled to each other and the discs d1 to d6 are brought downward. Furthermore, FIGS. 9A and 9B are a cross sectional view of the disc holding/separating mechanism 1100 and an unfolded view of the first guide member 5100 and the third guide member 5300 when they are separated to each other and a selected disc 80 is separated from the remaining discs.

As shown in FIG. 5A and FIG. 6A, spiral grooves 5201 are provided on an outer surface of the second guide member 5200. Projections (not shown) that are provided on an inner surface of the third guide member 5300 are engaged with the spiral grooves 5201 of the second guide members 5200, respectively. When the second guide member 5200 is caused to rotate about its own axis by a drive mechanism (not shown), the third guide member 5300 moves up or down along its own axis (namely, a vertical direction).

Further, as shown in FIGS. 5A and 5B and FIGS. 6A and 6B, spiral grooves 5101, 5102 and 5103 are provided on an outer surface of the first guide member 5100. Furthermore, as shown in FIGS. 5A and 5B and FIGS. 6A and 6B, spiral grooves 5301, 5302 and 5303 are provided on an outer surface of the third guide member 5300. When the third guide member 5300 is moved up and is coupled to the first guide member 5100, the spiral grooves 5101, 5102 and 5103 are connected to the spiral grooves 5301, 5302 and 5303, respectively.

The projections 5401a of the disc rack 5401 shown in FIG. 4A are engaged with the spiral grooves 5101, 5102 and 5103 or the spiral grooves 5301, 5302 and 5303, as indicated circles in FIG. 5B and FIG. 6B. Therefore, when the first guide member 5100 and the third guide member 5300 rotate about their own axis, each disc racks 5401, which are not rotated, moves up and down vertically. Further, the spiral grooves 5101, 5102, 5103 and 5301, 5302, 5303 are designed as illustrated in FIG. 7B and FIG. 8B.

The operation of the disc holding/separating mechanism 1100 will now be described. FIGS. 10A to 10H are schematic side views illustrating the playback operation of the third disc d3 in the disc player according to the first embodiment after the playback of the second disc d2 is finished.

Figure 10A:
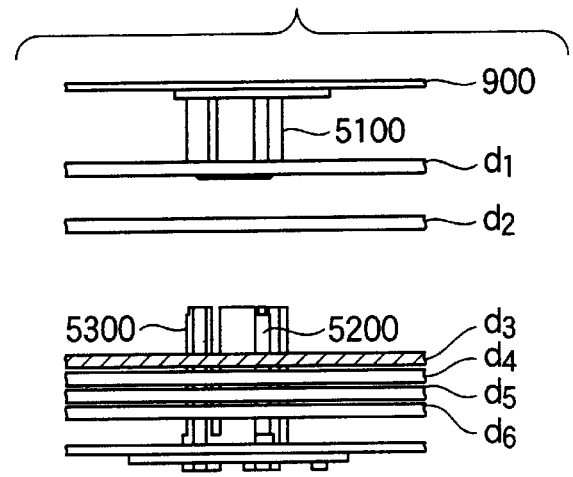
FIGS. 10A to 10H are schematic side views illustrating the operation of the disc player according to the first embodiment.
Figure 10B:
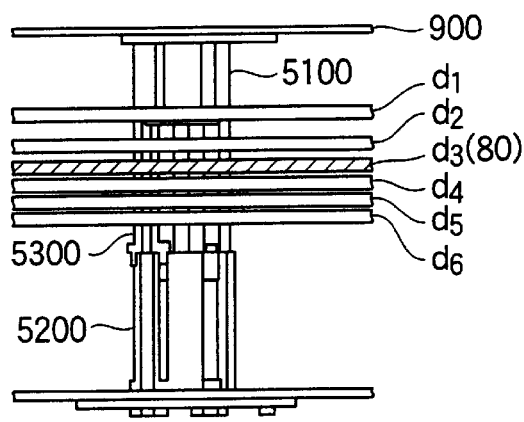

FIG. 10A illustrates that the second disc d2 placed on the turntable 3 is held by a carrier arm (not shown in this figure and described later) of the disc carrier mechanism 1200 shown in FIG. 1 at a given position after the playback of the second disc d2 has been completed. At this time, the first disc d1 is held by the first guide member 5100 while the third disc d3 to the sixth disc d6 are held by the third guide member 5300. The third guide member 5300 which holds the third disc d3 to the sixth disc d6 is now moved upward to be connected to the first guide member 5100, as shown in FIG. 10B. At this time, the second disc d2 is supported by the second spacer which is carried by the third guide member 5300. When the second disc d2 is carried by the third guide member 5300 in the manner shown in FIG. 10B, the carrier arms (not shown in FIGS. 10A to 10H) which holds the second disc d2 moves away therefrom. Subsequently, the discs d1 to d6 are moved upward by the first spacer 5410 to the sixth spacer 5460 shown in FIG. 1, in a manner illustrated in FIG. 10C, and the second disc d2 is transferred onto the first guide member 5100. At this time, the third disc d3 which is supported by the third spacer 5430 is held by the carrier arms. On the other hand, the third guide member 5300 moves downward while holding the fourth disc d4 to the sixth disc d6, and thus is separated from the first guide member 5100. As a result of the described operation, a space $D_B$ is created between the third disc d3 and the fourth disc d4, as shown in FIG. 10D, and the turntable 3 is conveyed from an outside of the discs held by the disc holding/separating mechanism 1100 into the space $D_B$, as shown in FIG. 10E. When the third disc d3 is placed on the turntable 3, a space $D_A$ is created between the third disc d3 and the second disc d2 as shown in FIG. 10F. The clamper 5 is then conveyed into the space $D_A$ as shown in FIG. 10G. After the clamper 5 is conveyed in this manner, the third disc d3 is urged by the clamper 5 against the turntable 3, as shown in FIG. 10H.

In order to clamp a disc, if both the turntable 3 and the clamper 5 are simultaneously inserted as in the conventional practice, the space $D_A$ and the space $D_B$ must be simultaneously secured above and below the selected disc which is held by the carrier arm, thus increasing the required vertical size of the apparatus.

By contrast, in the disc player according to the first embodiment of the present embodiment, the turntable 3 and the clamper 5 are allowed to be conveyed from each other to the playback position separately. Accordingly, by inserting the clamper 5 into the space $D_A$ which is formed by placing the selected disc on the turntable 3, a space which has been secured in the prior art practice above the selected disc can be omitted, thereby allowing the required vertical size of the apparatus to be reduced.

In the above description, when the selected disc 80 is placed on the turntable 3, a center of the turntable 3 is positioned off a central axis of the plurality of discs d1–d6 held by the disc holding/separating mechanism 1100. However, when the selected disc 80 is placed on the turntable 3, a center of the turntable 3 may be positioned on a central axis of the plurality of discs d1–d6 held by the disc holding/separating mechanism 1100.

2. Playback Section Moving Mechanism

Figure 11:
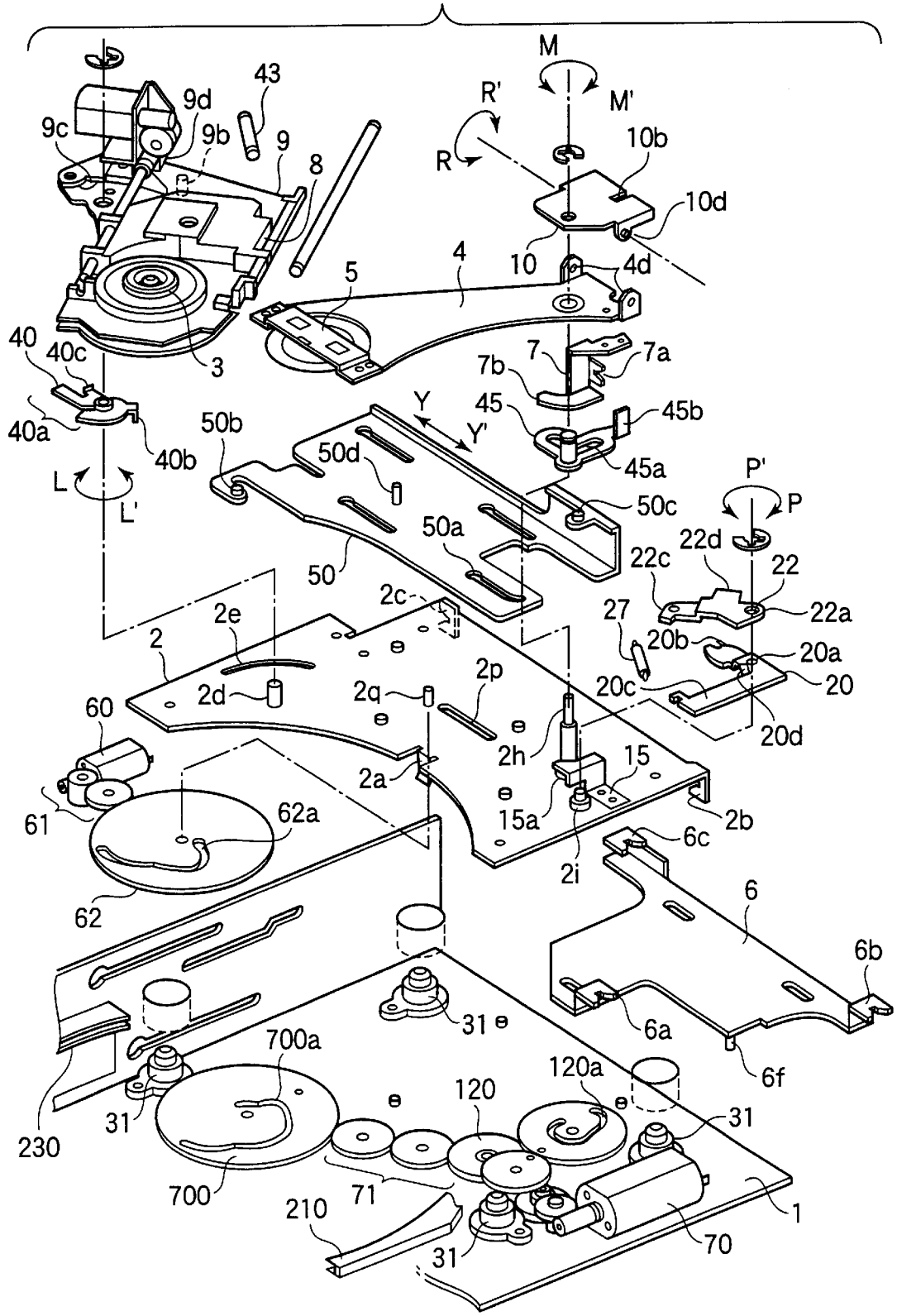
FIG. 11 is an exploded perspective view showing a playback section moving mechanism of the disc player according to the first embodiment.

FIG. 11 is an exploded perspective view of a playback section and a playback section moving mechanism of the disc player according to the first embodiment of the present embodiment. In FIG. 11, a reference numeral 1 denotes a base plate as a part of a main body of the disc player. The base plate 1 supports a sub-base 2 in a floating manner through vibration absorbing members (or cushioning members) 31. Fixedly mounted on the sub-base 2 are a first pole 2d which rotatably supports the playback base 9, on which the turntable 3 and the optical pickup 8 are mounted, and a second pole 2h which rotatably supports the clamper arm 4, on which the clamper 5 is mounted. An operation of alternately conveying the turntable 3 and the clamper 5 in the manner mentioned above is performed by a motion control member 50, which is supported on the sub-base 2 so as to be slidable in a direction indicated by arrows Y–Y'. A pin 50b fixedly mounted on the motion control member 50 engages with a cam edge 40a formed in a first lever 40 which causes the rotation of the playback base 9. Another pin 50c is fixedly mounted on the motion control member 50 and engages with a cam groove 45a formed in a second lever 45 which causes the rotation of the clamper arm 4. Together with the playback base 9, the first lever 40 is supported by the first pole 2d so as to be rotatable in a direction indicated by arrows L–L'. A spring 43 which urges the playback base 9 extends between a hook 9d formed on the playback base 9 and a hook 40b formed on the first lever 40.

Together with the clamper arm 4, the second lever 45 is supported on the second pole 2h so as to be rotatable in a direction indicated by arrows M–M'. A folded tab 45b on the second lever 45 engages with a notch 10b formed in a clamper base 10, which has poles 10d engaging with openings 4d in the clamper arm 4 to support it to be rotatable in a direction indicated by arrows R–R'.

When the motion control member 50 moves in the direction of the arrow Y, the first lever 40 which engages with the pin 50b rotates in the direction of the arrow L, whereby the spring 43 engaging with the hook 40b of the first lever 40 causes the playback base 9 to rotate in the direction of the arrow L. When the motion control member 50 moves further in the direction of the arrow Y, the second lever 45 which engages with the pin 50c rotates in the direction of the arrow M, whereby the clamper base 10 having the notches 10b engaged with the folded tab 45b rotates in the same direction to cause the clamper arm 4 to rotate.

The playback section moving mechanism shown in FIG. 11 will now be described in more detail. A lock member 6 locks the floating sub-base 2 when the clamper 5 secures the disc 80 on the turntable 3, and is supported by the base plate 1 so as to be slidable in the direction of the arrows Y–Y'. The lock member 6 is provided with pawls 6a, 6b and 6c which engage with V-shaped pawls 2a, 2b and 2c, respectively, which are formed in the sub-base 2.

Figure 12A:
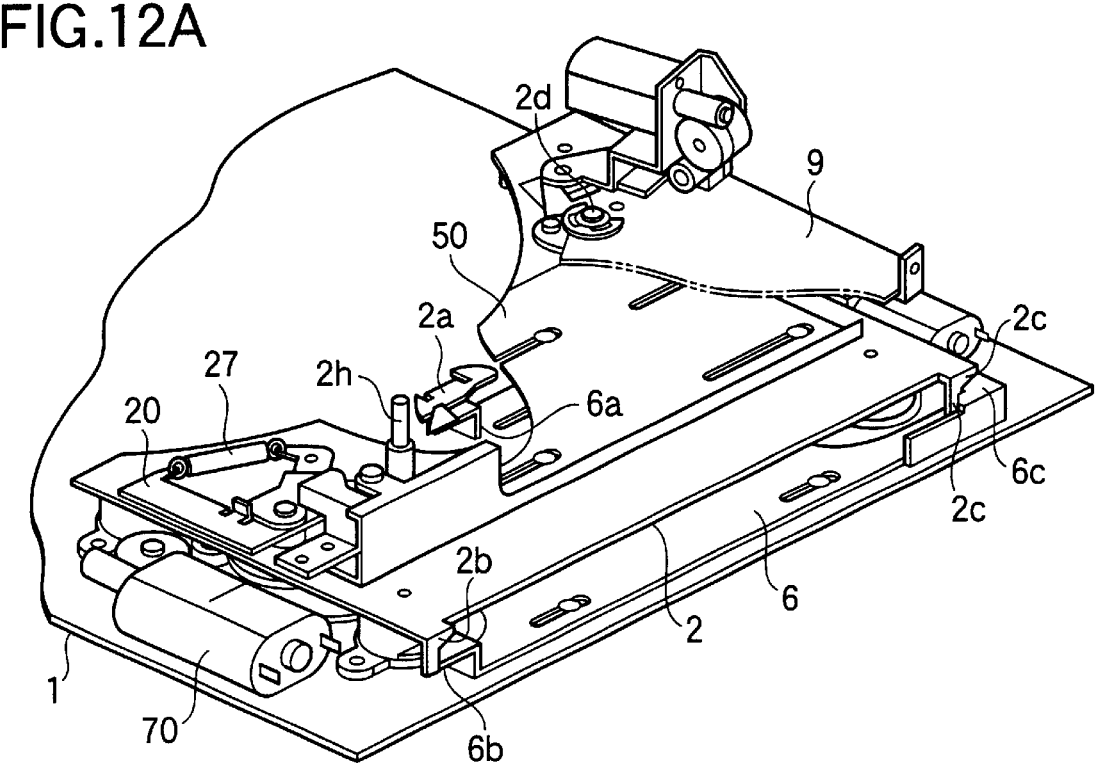
FIGS. 12A and 12B are perspective views of a sub-base of the disc player according to the first embodiment.
Figure 12B:
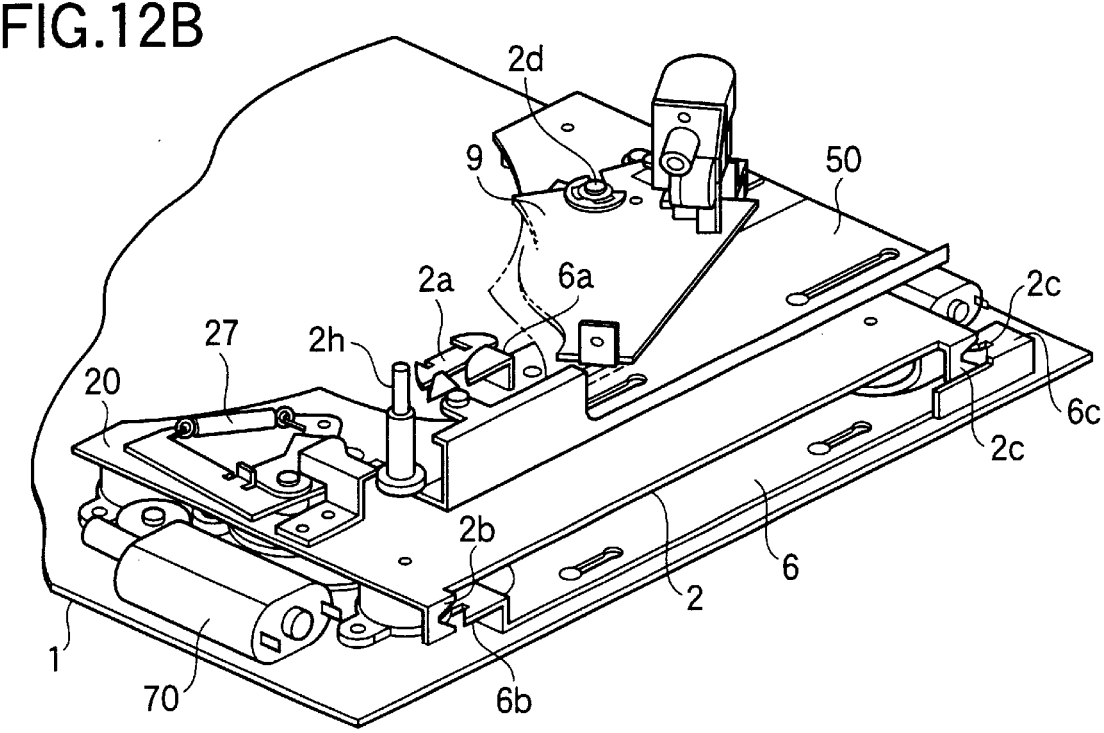

Until the selected disc 80 is clamped, the lock member 6 locks the sub-base 2 in a manner illustrated in FIG. 12A. When the selected disc 80 is clamped, the lock member 6 unlocks the sub-base 2, as shown in FIG. 12B. A cam gear 120 is provided with a cam groove 120a which engages with a pin 6f fixedly mounted on the underside of the lock member 6, as shown in FIG. 11, and controls the lock member 6, namely, locking and unlocking the sub-base 2. The cam gear 120 is driven by a second motor 70 fixedly mounted on the base plate 1 through a gear train 71 which includes gears rotatably mounted on the base plate 1.

A first cam gear 62 causes the motion control member 50 to slide in the direction of the arrows Y–Y', and is provided with a cam groove 62a which is engaged with a pin 50d fixedly mounted on the underside of the motion control member 50. The first cam gear 62 is rotatably mounted on the sub-base 2 by means of a pin 2q, and is driven by a first motor 60 through a gear train 61 which includes gears rotatably mounted on the sub-base 2. The pin 50d on the motion control member 50 extends through an elongate slot 2p formed in the sub-base 2 to be engaged with the cam groove 62a.

The first lever 40 is provided with the cam edge 40a which is engaged with the pin 50b fixedly mounted on the motion control member 50, and a folded tab 40c which abuts against a rectangular slot 9c formed in the playback base 9 to lock it at a given position when the playback base 9 is driven in the direction of the arrow L under the influence of the spring 43. A pin 9b is fixedly mounted on the backside of the playback base 9 to engage with a curvilinear elongate slot 2e formed in the sub-base 2.

There is provided a guide member 7 which holds the clamper arm 4 at a position offset from the selected disc when it is not clamped, and is secured to the clamper arm 4. The guide member 7 has a groove 7a which is engaged with a folded tab 15a of a guided member 15 which is mounted on the sub-base 2. The second lever 45, the clamper arm 4 and the clamper base 10 are rotatably mounted on the sub-base 2 by means of the second pole 2h which is fixedly mounted thereon.

A clamp control member 20 controls a clamping operation for urging a selected disc 80 against the turntable 3, and is driven by a clamp drive member 22. The clamp control member 20 is provided with a notch 20b which engages with a depending portion 7b of the guide member 7 to swing the clamper arm 4 in the direction of the arrows R–R'. The clamp drive member 22 has a pin 22b fixedly mounted thereon which extends vertically downward to engage a cam groove 50a formed in the motion control member 50. The clamp control member 20 and the clamp drive member 22 has openings 20a and 22a, respectively, through which a pole 2j fixedly mounted on the sub-base 2 extends, whereby the both members are rotatably supported by the pole 2j. A spring 27 extends between a hook 22b on the clamp drive member 22 and a hook 20c on the clamp control member 20 to urge the clamp drive member 22 to rotate in the direction of the arrows P–P'. In addition, the clamp drive member 22 is provided with a projection 22d which abuts against a folded tab 20d of the clamp control member 20 to lock it at a given position as the clamp control member 20 is urged to rotate in the direction of the arrow P under the influence of the spring 27.

3. Disc Carrier Mechanism

Figure 13:
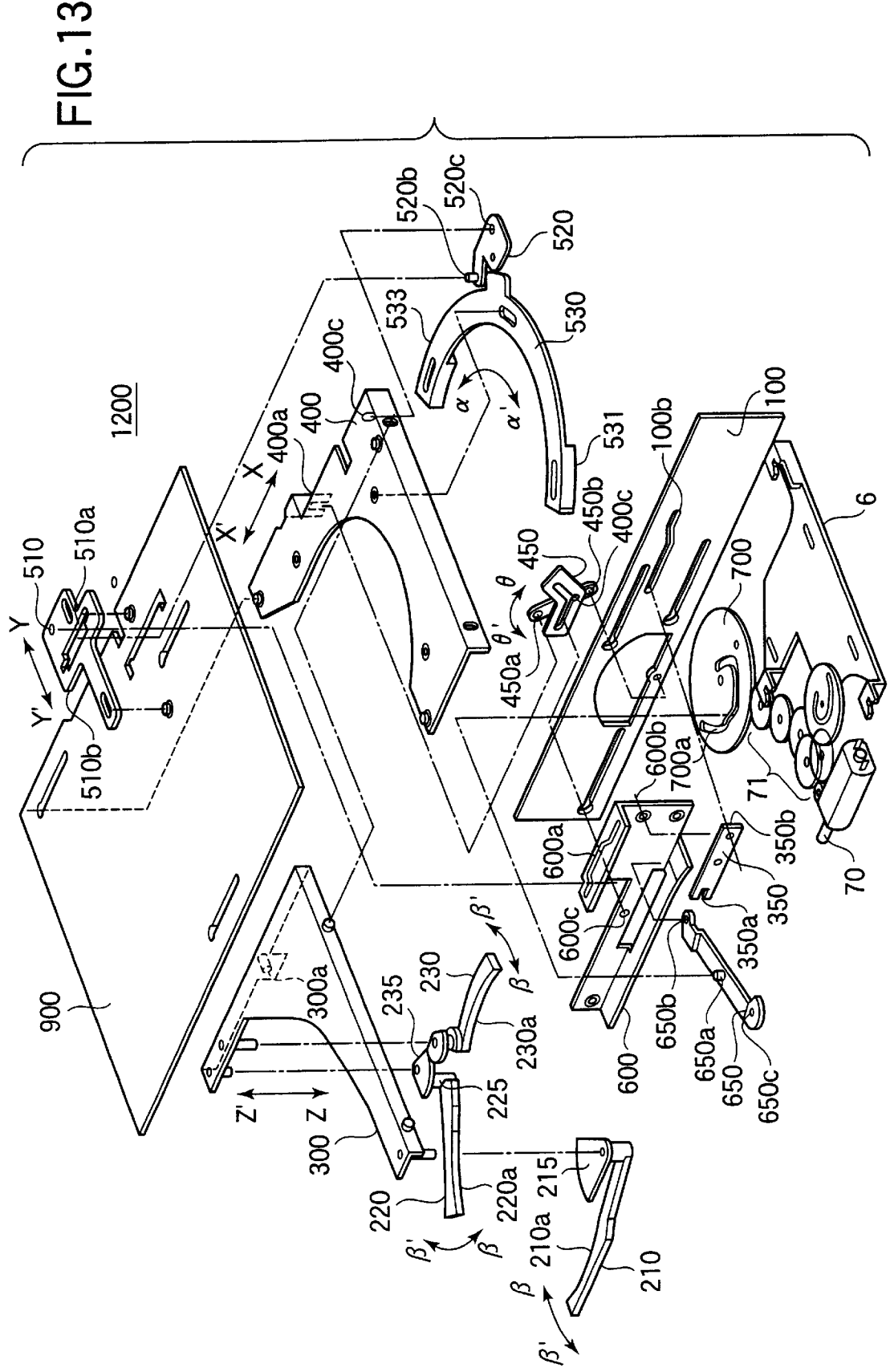
FIG. 13 is an exploded perspective view showing a disc carrier mechanism of the disc player according to the first embodiment.

FIG. 13 is an exploded perspective view of a disc carrier mechanism 1200 which is used to convey a selected disc 80 and place it on the turntable 3. Carrier arms 210, 220 and 230 serve holding a disc, and are mounted on poles fixedly mounted on an elevating base 300 so as to be swingable in a direction indicated by arrows β–β'. The elevating base 300 is pivotally mounted on a translating base 400 which conveys a disc as held between the carrier arms 210, 220 and 230 onto the turntable 3 so as to be slidable in a direction indicated by arrows Z–Z'. The translating base 400 is supported by a top plate 900 so as to be slidable in a direction of arrows X–X'.

Figure 10C:
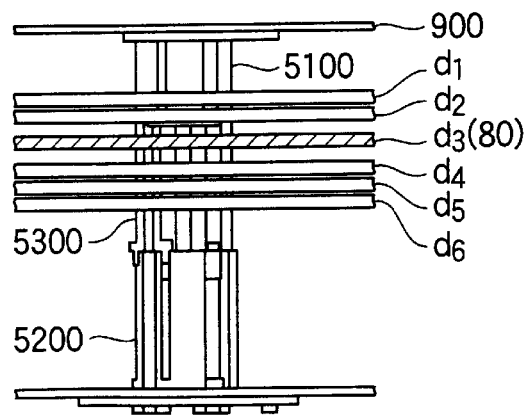
Figure 10D:
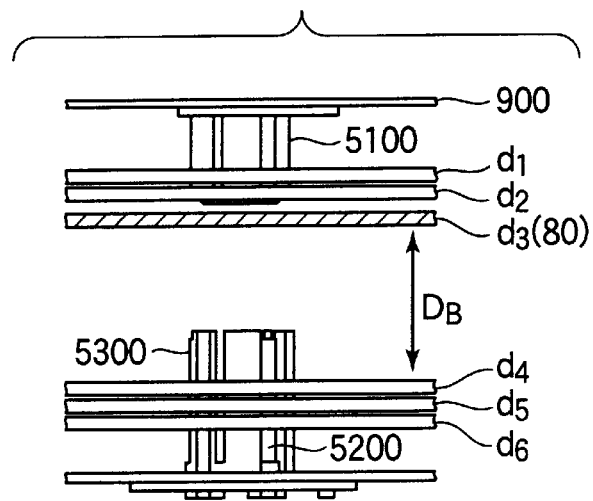
Figure 10E:
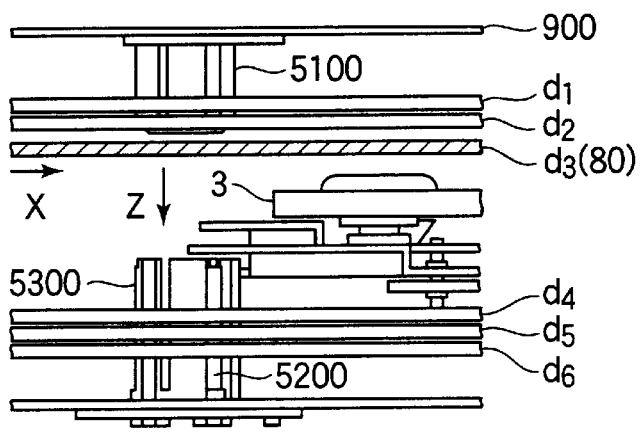
Figure 10F:
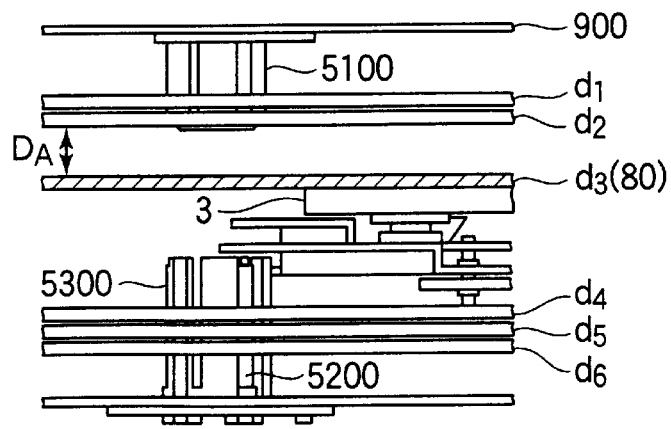
Figure 10G:
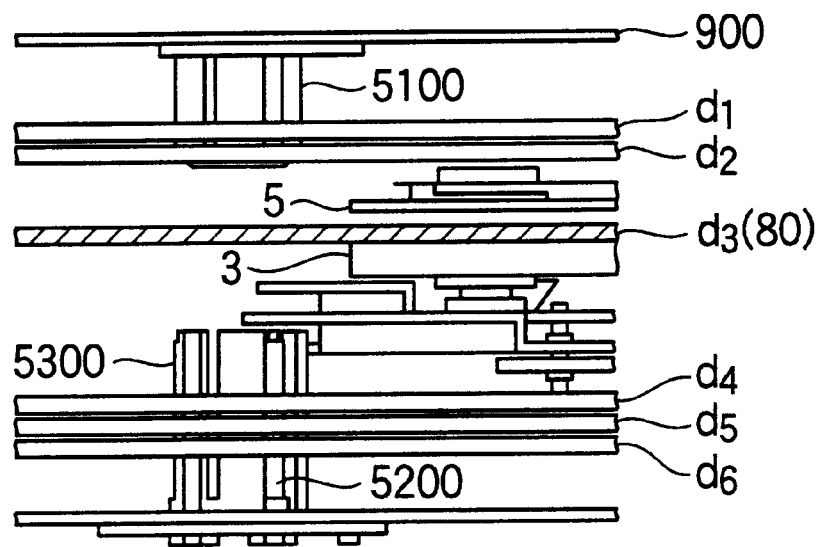
Figure 10H:
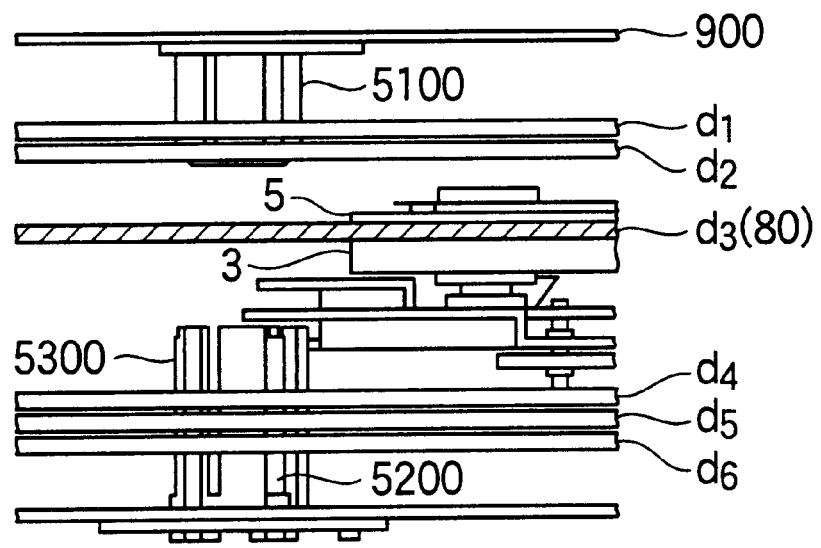

When the first guide member 5100 and the third guide member 5300 are connected together as shown in FIG. 10C and a selected disc 80 (or d3) moves to a given hold position, the carrier arms 210, 220 and 230 rotate in the direction of the arrow β, thus holding the selected disc 80 around the outer edge thereof. When the selected disc 80 is held in this manner, the third guide member 5300 moves down to be separated from the first guide member 5100, thus assuming a condition shown in FIG. 10D. When the turntable 3 is conveyed in a manner indicated in FIG. 10E, the translating base 400 moves in the direction of the arrow X, whereby the selected disc 80 which is held between the carrier arms 210, 220 and 230 is conveyed onto the turntable 3, whereupon the elevating base 300 moves down in the direction of the arrow Z shown in FIG. 13 to place the selected disc 80 onto the turntable 3, in a manner indicated in FIG. 10F. When the selected disc 80 is placed on the turntable 3, the carrier arms 210, 220 and 230 swing in the direction of the arrow β' to move away from the selected disc 80.

The disc carrier mechanism shown in FIG. 13 will now be described in more detail.

A ring gear 530 causes the carrier arms 210, 220 and 230 to swing in the direction of the arrows β–β' as the selected disc 80 is held between them and as they move away from the disc, and include gears 531 and 533 which mesh with gears 215 and 235, respectively, which are secured to the carrier arms 210 and 230, respectively. Further, a gear 225 on the carrier arm 220 and the gear 235 on the carrier arm 230 mesh with each other. The ring gear 530 meshes with a hold lever 520, which has an opening 520c, which is engaged by a pin 400c extending from the translating base 400, whereby the hold lever 520 is pivotally mounted. When the hold lever 520 swings about the pin 400c, the ring gear 530 rotates in a direction indicated by arrows α–α'. The resulting rotation of the ring gear 530 drives the carrier arms 210, 220 and 230, which then swing in the direction of the arrows β–β' to hold the selected disc or to move away therefrom. The hold lever 520 has a pin 520b which is engaged with a cam groove 510b in a hold drive plate 510 which is supported on the top plate 900 so as to be slidable in the direction of arrows Y–Y', whereby the hold lever 520 is caused by the hold drive plate 510 to swing about the pin 400c in the direction of the arrows Y–Y'.

A translating lever 450 causes the translating base 400 to translate in the direction of the arrows X–X' when conveying the selected disc 80 which is held between the carrier arms 210, 220 and 230 onto the turntable 3, and is rotatably mounted on a sidewall 100 so as to be rotatable in a direction indicated by arrows θ–θ' about a pole formed by a pin 450b. A pin 450a, which engages with a notch 400a in the translating base 400, is fixedly mounted on the translating lever 450. When the translating lever 450 rotates in the direction of the arrow θ about the pin 450b, the translating base 400 translates in the direction of the arrow X, whereby the selected disc which is held between the carrier arms 210, 220 and 230 is conveyed onto the turntable 3.

The hold drive plate 510, which causes the hold lever 520 to swing as the selected disc is held and as the carrier arms move away therefrom, and the translating lever 450, which causes the translating base 400 to translate as the selected disc is conveyed onto the turntable 3, are driven by a mode switching member 600. The mode switching member 600 is provided with a cam groove 600a which is engaged with a pin 510a on the hold drive plate 510, and a pin 600c which engages with a cam groove 450c formed in the translating lever 450. The mode switching member 600 is mounted on the sidewall 100 so as to be slidable in the direction of the arrows X–X'. When the mode switching member 600 slides in the direction of the arrows X–X', the cam groove 600a and the pin 600c cause the hold drive plate 510 to slide in the direction of the arrows Y–Y' and cause the translating lever 450 to rotate in the direction of the arrows θ–θ' about the pin 450b. The mode switching member 600 is driven by the second motor 70 through a gear train 71, a cam gear 700, and a lever 650 having a pin 650a which engages with a cam groove 700a in the cam gear 700. The lever 650 has an opening 650c, which engages with a pole (not shown) on the base plate 1, whereby it is rotatably mounted. It also includes a pin 650b, which engages BAS with an opening formed in the mode switching member 600. When the drive power from the second motor 70 is transmitted to the cam gear 700 through the gear train 71, the cam groove 700a acts to cause the lever 650 to rotate about the opening 650c, whereby the mode switching member 600 is caused to slide in the direction of the arrows X–X'.

An elevating lever 350 elevates the elevating base 300 in the direction of the arrows Z–Z' when the disc which is held between the carrier arms 210, 220 and 230 is to be placed onto the turntable 3. The elevating lever 350 is rotatably mounted by a pin 600b which is fixedly mounted on the mode switching member 600, and has a notch 350a which engages a pin 300a fixedly mounted on the elevating base 300. The elevating lever 350 also has a pin 350b fixedly mounted thereon which engages a cam groove 100b formed in the sidewall 100. When the mode switching member 600 slides in the direction of the arrows X–X', a step formed in the cam groove 100b causes it to swing about the pin 600b in the direction of the arrows Z–Z'. Accordingly, the pin 300a which is engaged with the notch 350a is simultaneously driven in the direction of the arrows Z–Z', thus elevating the elevating base 300.

4. Procedures for Disc Playback

The operation of the disc player according to the present embodiment will now be described with reference to FIGS. 14A–14C to FIGS. 18A–18C.

(a) Holding Edges of Selected Disc

Figure 14A:
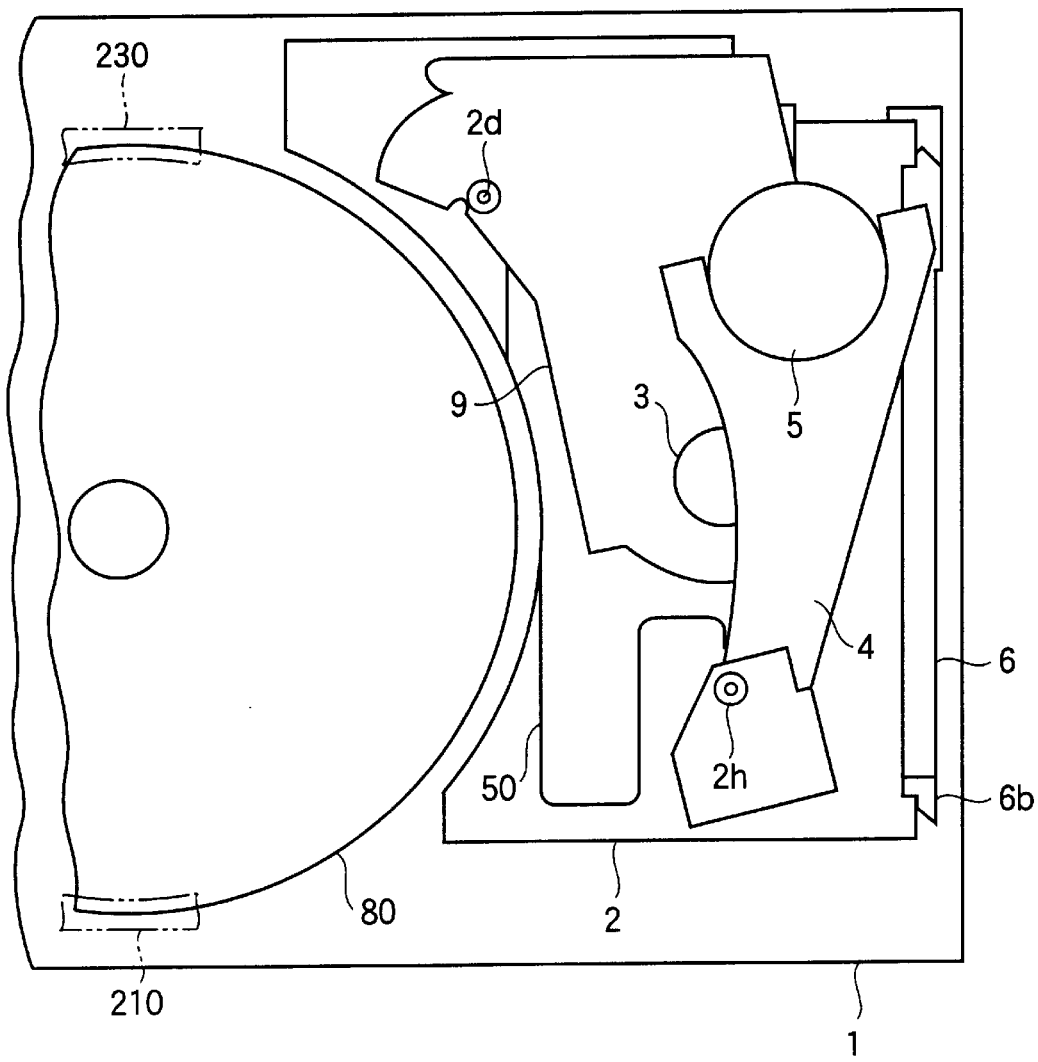
FIGS. 14A to 14C are a schematic plan view, a side view, and a detailed plan view of the disc player according to the first embodiment.
Figure 14B:
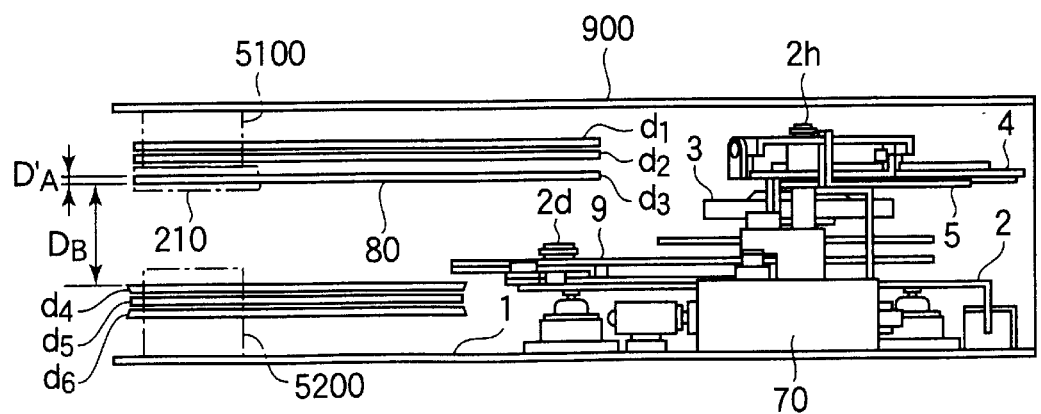
Figure 14C:
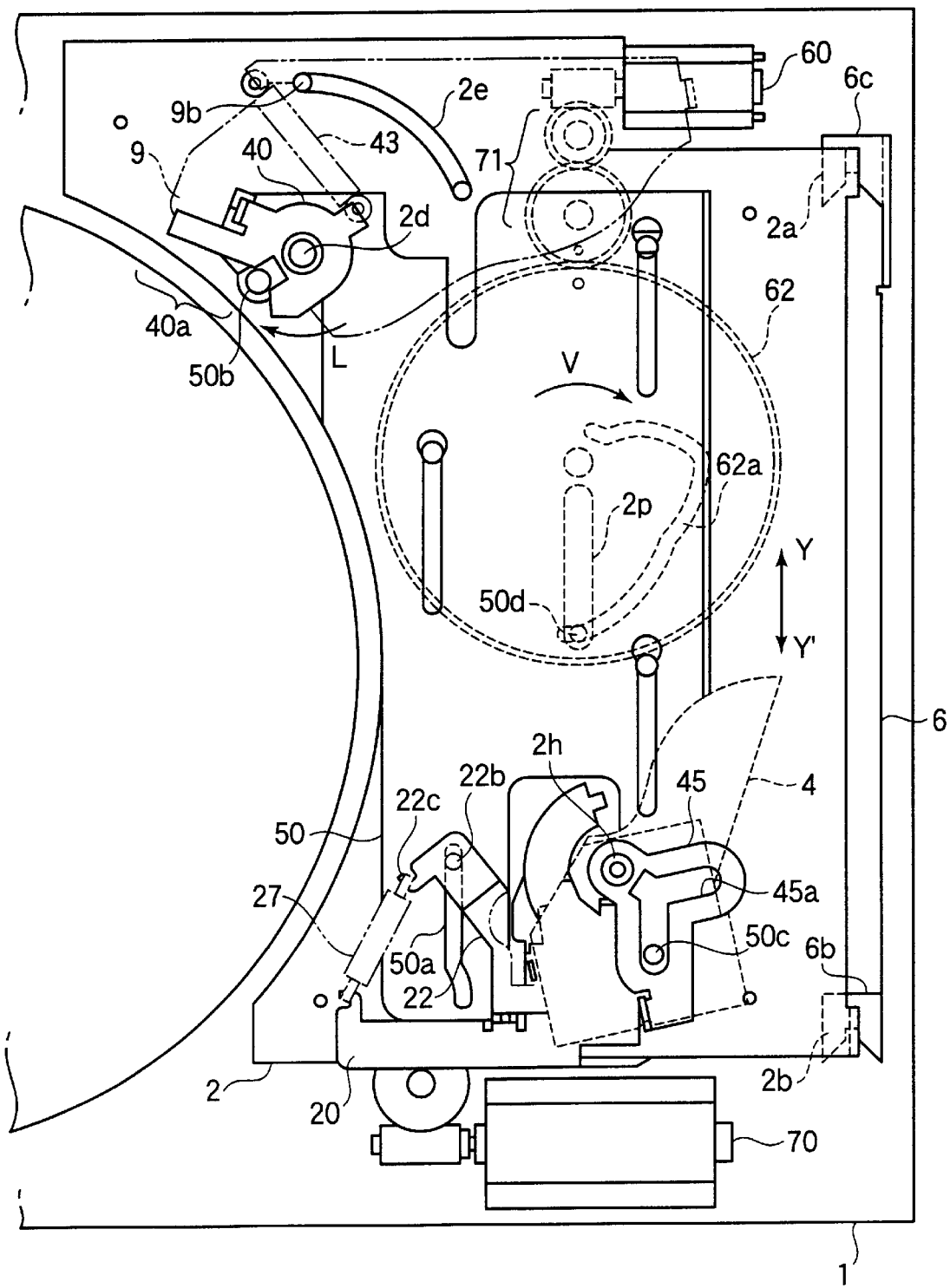

FIGS. 14A–14C illustrates that the edges of a selected disc 80 is held by the carrier arms 210, 220 and 230 (the carrier arm 220 being not shown in FIGS. 14A–14C) of the disc holding/separating mechanism 1100 shown in FIG. 1 and FIG. 2. Further, a space $D_A'$ which is sufficient to avoid an interference of the carrier arms 210, 220 and 230 with an adjacent disc is secured over the selected disc 80. A space $D_B$ which allows the turntable 3 to be inserted is secured below the selected disc 80. At this time, the sub-base 2 is locked to the base plate 1 by the lock member 6, as shown in FIG. 12A.

(b) Moving Turntable into First Space

Figure 15A:
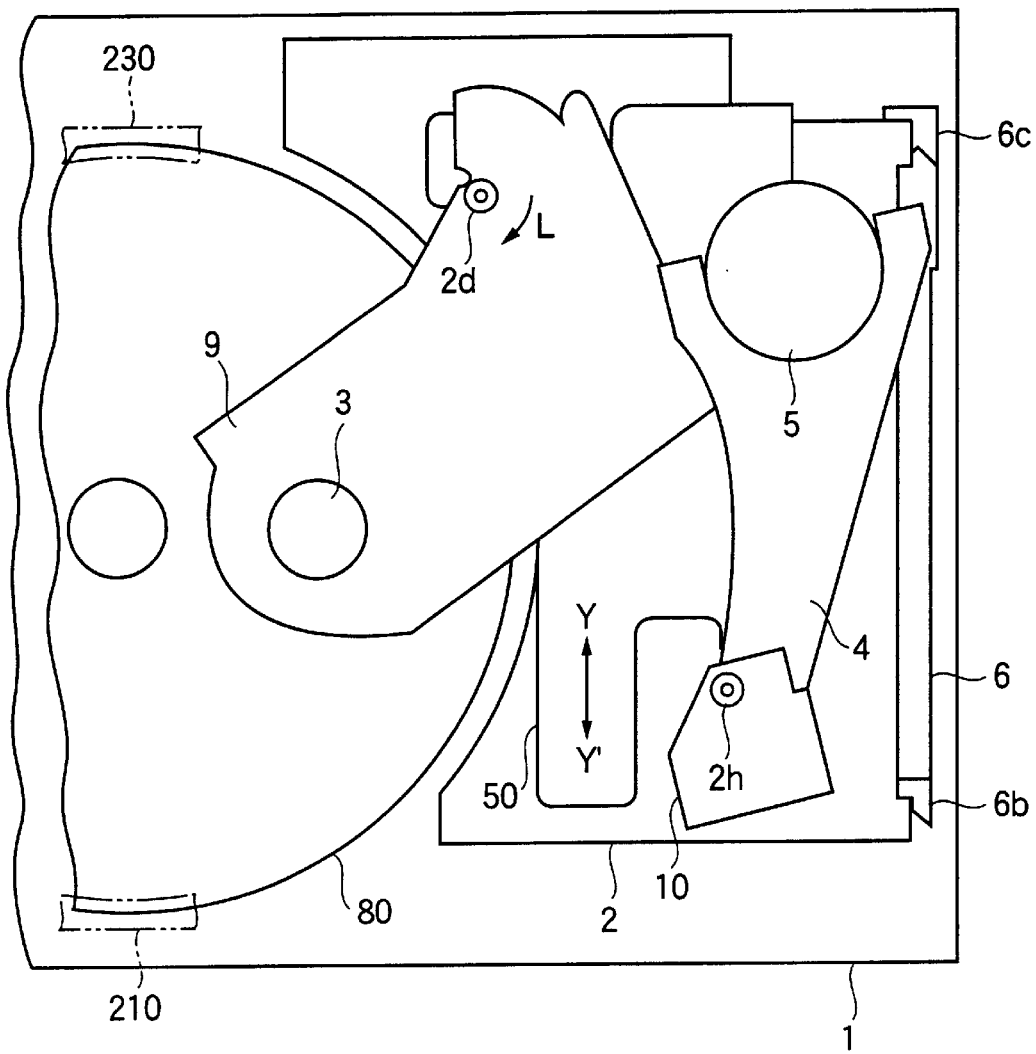
FIGS. 15A to 15C are a schematic plan view, a side view, and a detailed plan view of the disc player according to the first embodiment.
Figure 15B:
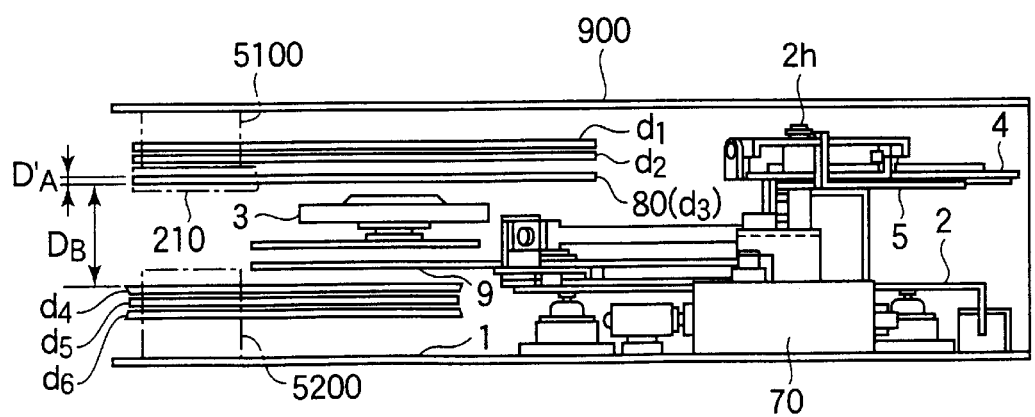
Figure 15C:
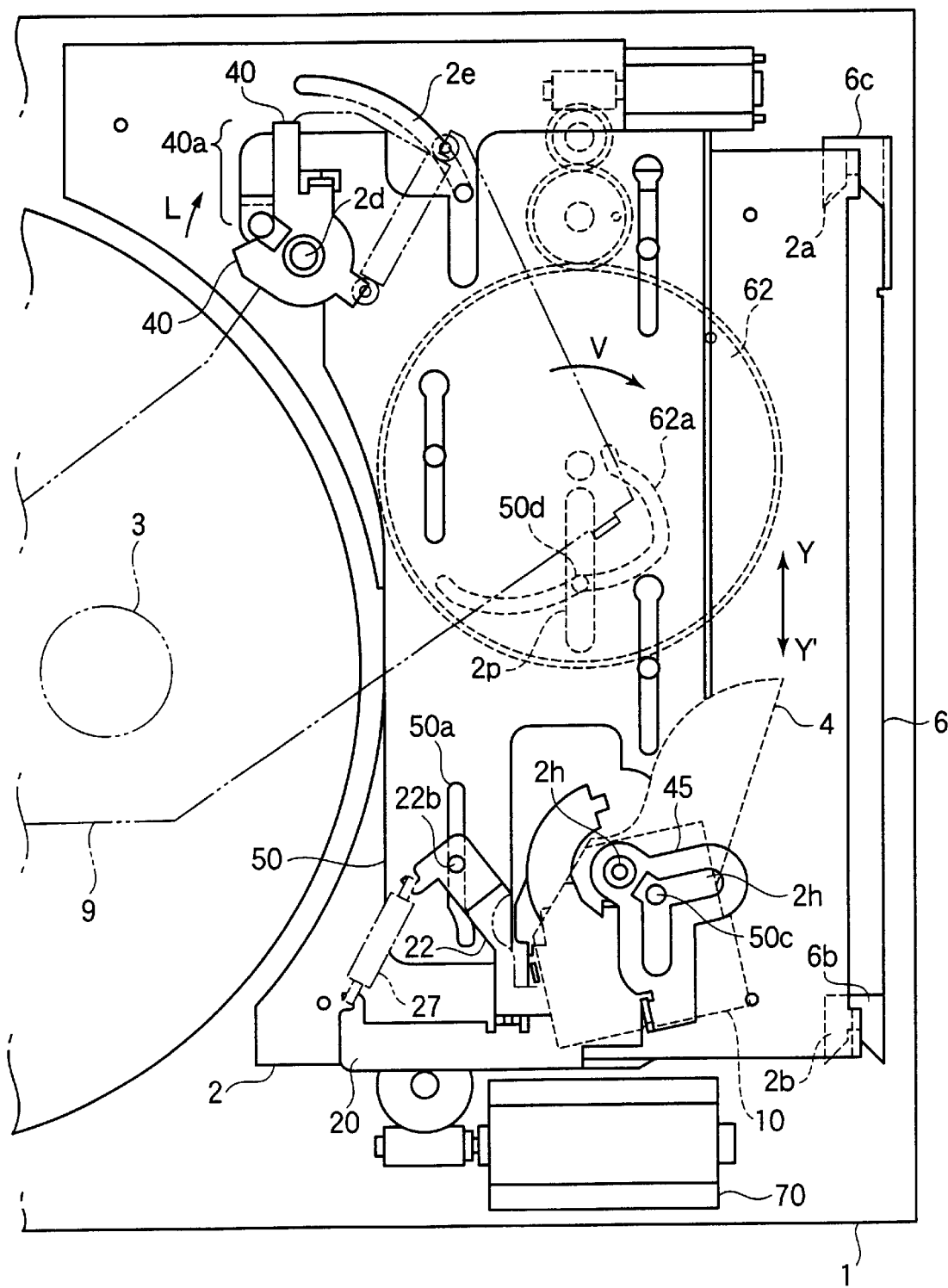

As shown in FIGS. 15A–15C, when the first cam gear 62 is driven by the first motor 60 through the gear train 61 to rotate in a direction indicated by an arrow V shown, the pin 50d which engages with the cam groove 62a moves toward the center of the first cam gear 62, whereby the motion control member 50 moves in the direction of the arrow Y. This causes the first lever 40 which engages with the pin 50b to rotate in the direction of the arrow L and also causes the playback base 9 which is urged to rotate in the direction of the arrow L by the spring 43 to rotate about the first pole 2d, whereby it is conveyed to the playback position shown in double dotted chain lines in FIG. 15C. The angle, through which the cam edge 40a in the first lever 40 rotates, is chosen to be slightly greater than the angle, through which the playback base 9 rotates, and accordingly, the spring 43 continues to urge the playback base 9 to rotate in the direction of the arrow L after such rotation, and the pin 9b abuts against the end of the curvilinear elongate slot 2e formed in the sub-base 2, thus allowing the playback base 9 to be positioned at the given playback position in a stable manner. At this time, the pin 50c on the motion control member 50 similarly moves in the direction of the arrow Y, but the pin 50c moves through the rectilinear portion of the cam groove 45a without causing a rotation of the second lever 45, and accordingly, only the playback base 9 rotates without accompanying rotation of the second lever 45 and movement of the clamper base 10.

In the disc carrier mechanism shown in FIG. 13, the cam groove 700a formed in the cam gear 700 represents an idling zone until the playback base 9 has been conveyed to the playback position, and during such zone, the lever 650 and the mode switching member 600 do not operate, whereby the selected disc 80 can be positioned in a stable manner while it is being held between the carrier arms 210, 220 and 230.

(c) Placing Selected Disc on Turntable

Figure 16A:
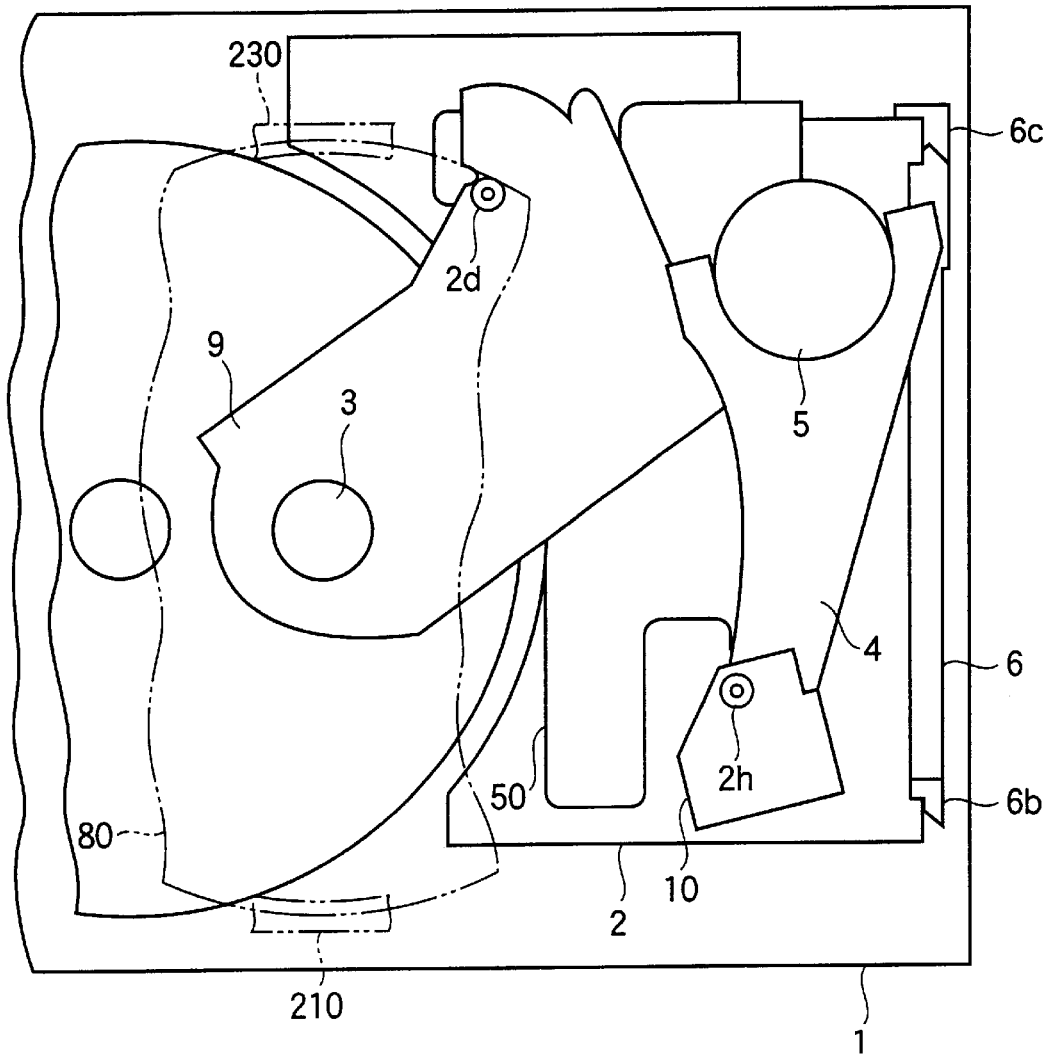
FIGS. 16A to 16C are a schematic plan view, a side view, and a detailed plan view of the disc player according to the first embodiment.
Figure 16B:
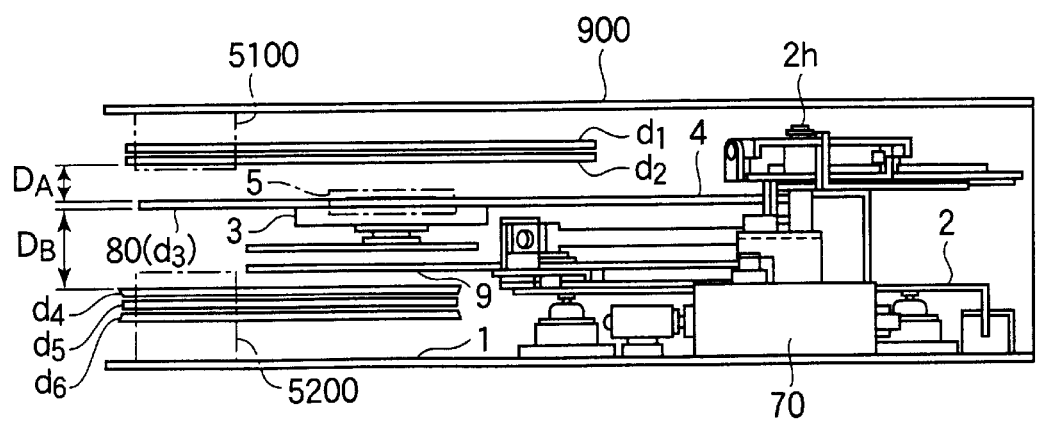
Figure 16C:
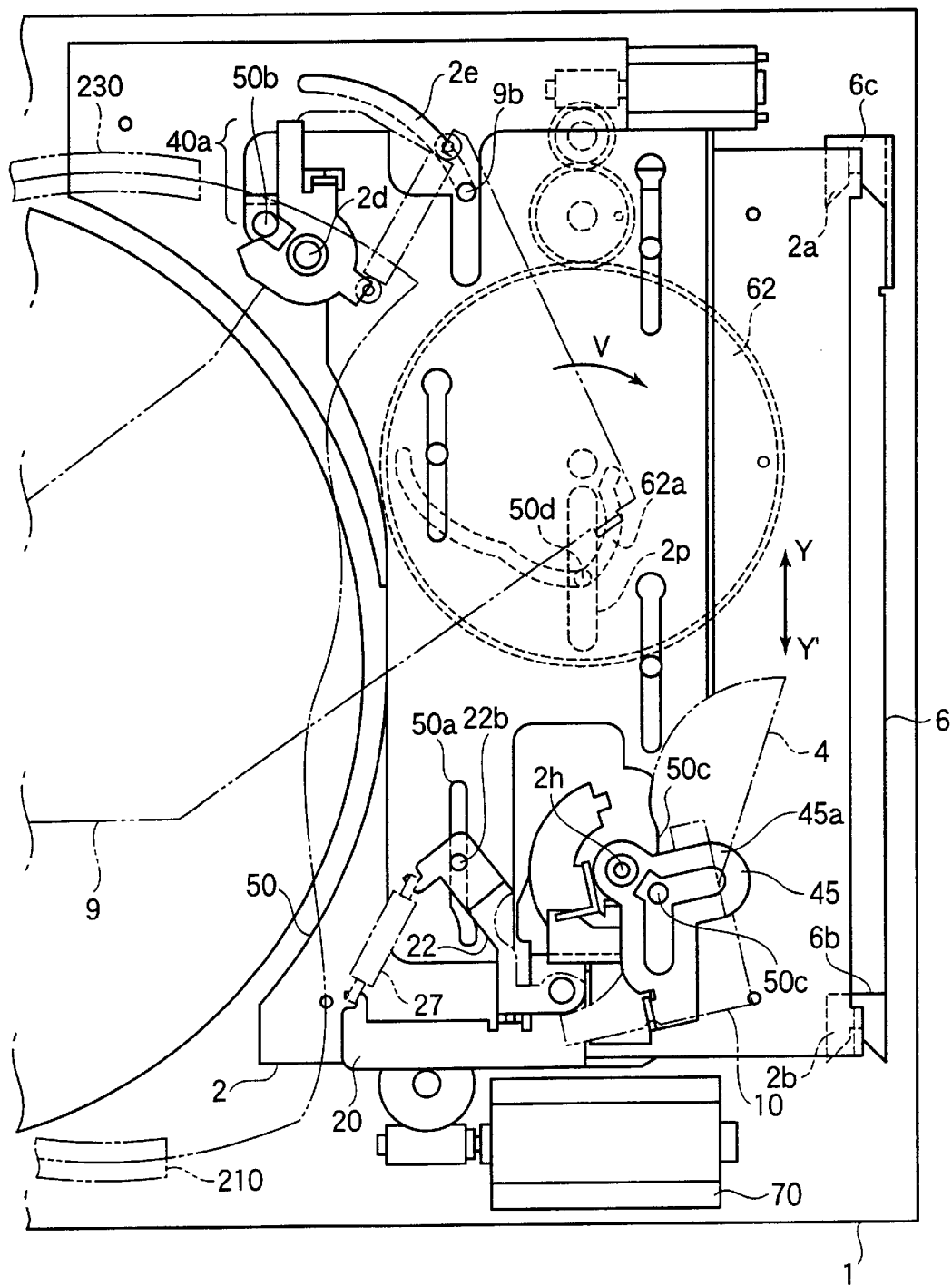

When the conveyance of the playback base 9 to its playback position is completed, the idling zone of the cam groove 700a formed in the cam gear 700 of the disc carrier mechanism shown in FIG. 13 is terminated, and the mode switching member 600 moves again in the direction of an arrow X, whereby the translating lever 450 rotates in the direction of an arrow θ. This allows the translating base 400 and the elevating base 300 which is supported thereby to translate in the direction of the arrow X, and accordingly, the selected disc 80, edges of which are held between the carrier arms 210, 220 and 230, is conveyed onto the turntable 3. As the mode switching member 600 is further moved in the direction of the arrow X, the elevating lever 350 swings in the direction of the arrow Z about the pin 600b. This causes the elevating base 300 which is engaged with the notch 350a in the elevating lever 350 to move down, and the selected disc 80 is placed on the turntable 3 as shown in FIGS. 16A to 16C. When the selected disc 80 is placed on the turntable 3 by the described operation, the space located above the selected disc 80 increases from the space $D_A'$ shown in FIG. 15B to the space $D_A$ shown in FIG. 16B. An interval from the conveyance of the playback base 9 to its playback position to the placement of the selected disc on the turntable 3 is covered by the idling zone in the cam groove 62a formed in the first cam gear 62, and accordingly, the motion control member 50 does not move.

(d) Moving Clamper into Second Space

Figure 17A:
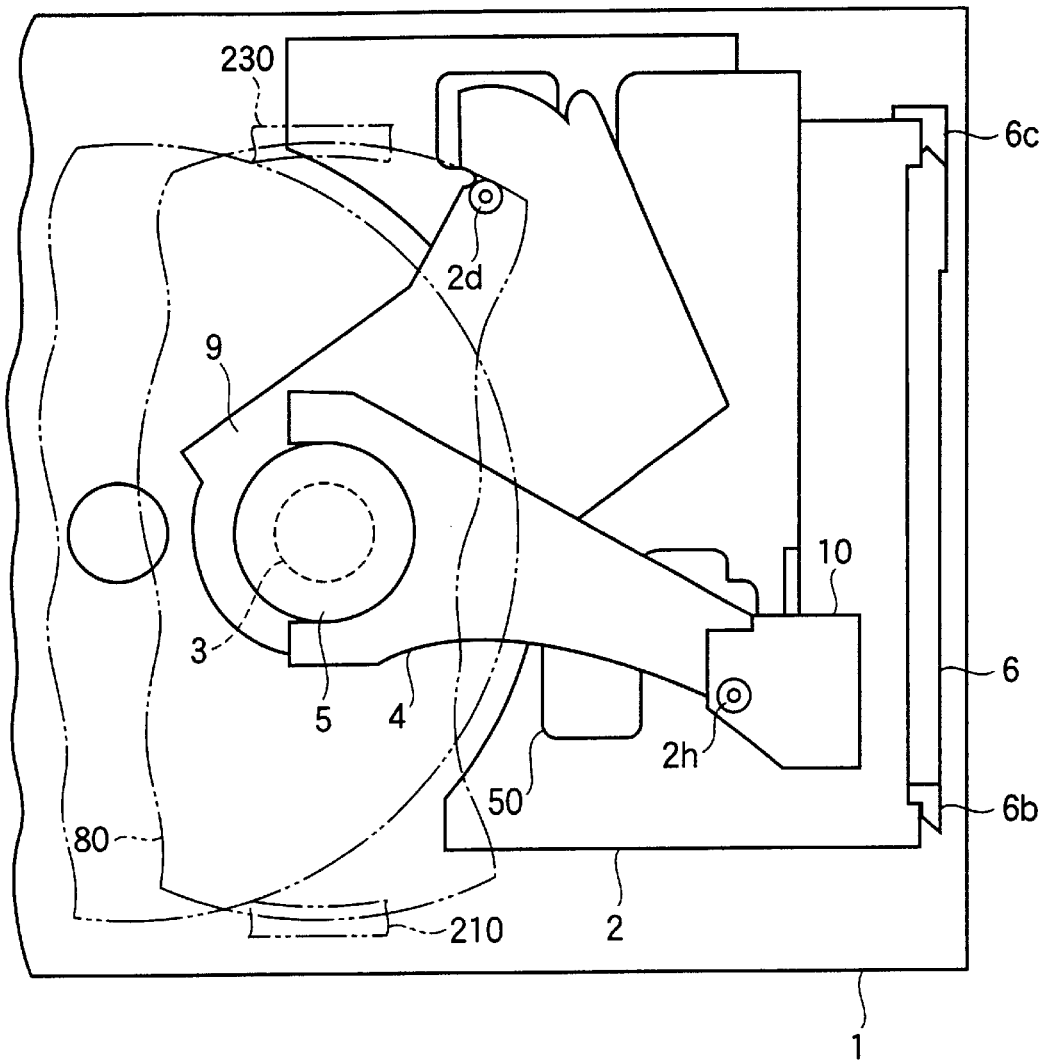
FIGS. 17A to 17C are a schematic plan view, a side view, and a detailed plan view of the disc player according to the first embodiment.
Figure 17B:
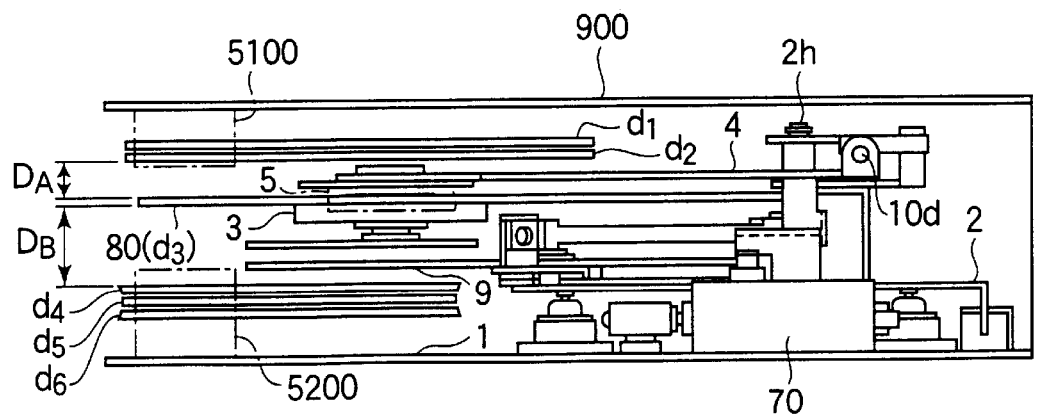
Figure 17C:
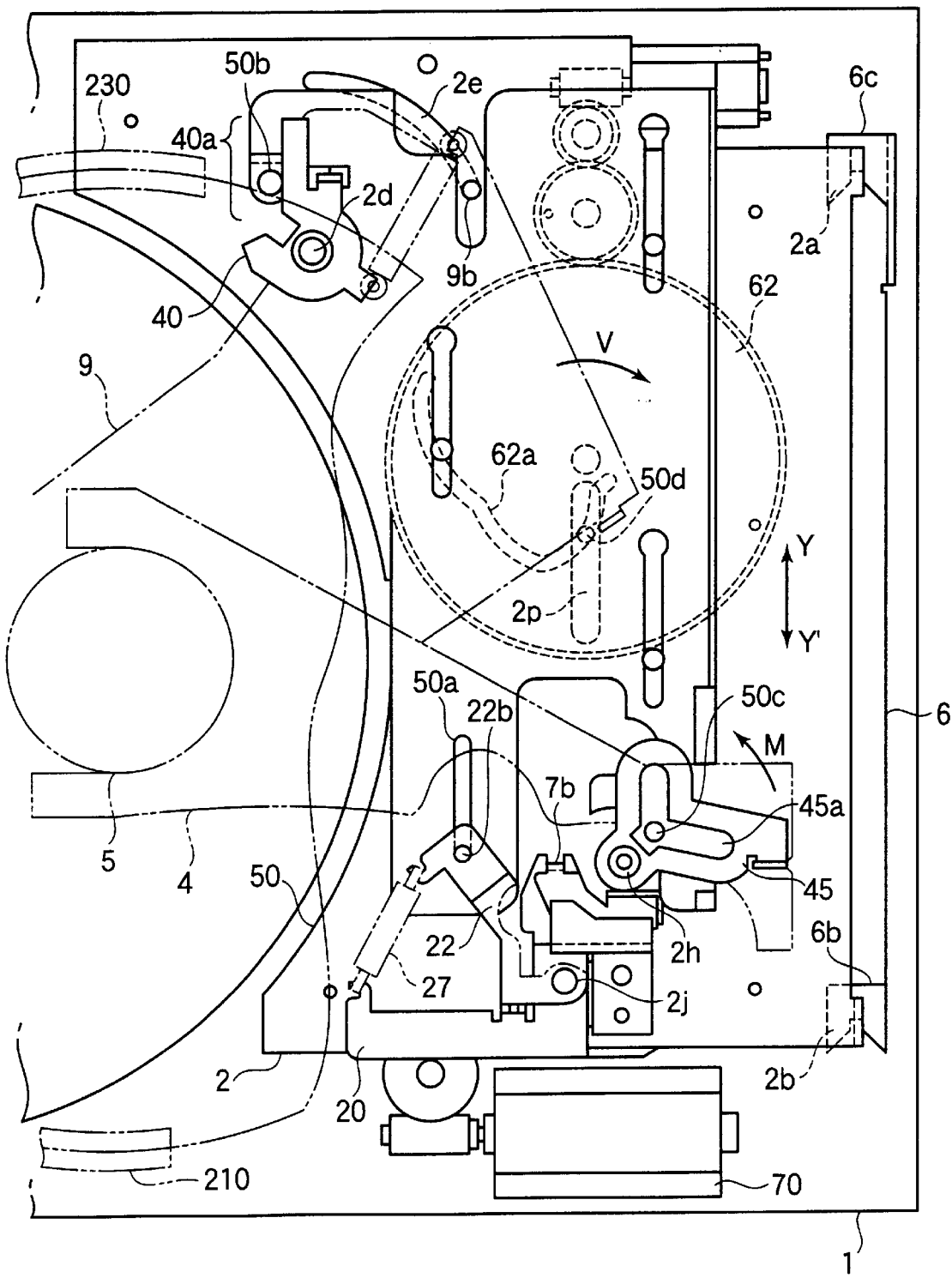

When the selected disc 80 is placed on the turntable 3, the idling zone of the cam groove 62a is terminated, and the pin 50d again moves toward the center of the first cam gear 62, whereby the motion control member 50 moves further in the direction of the arrow Y. This causes the second lever 45 which is engaged with pin 50c on the motion control member 50 to rotate about the second pole 2h in the direction of the arrow M as shown in FIGS. 17A to 17C. As a consequence, the clamper 5 is conveyed to the playback position shown in double doted chain lines as shown in FIG. 17C. At this time, the groove 7a in the guide member 7 engages with the folded tab 15a of the guided member 15, whereby the clamper arm 4 is maintained in a position which is offset from the selected disc 80 when it is not clamped. When the clamper base 10 has rotated to its given playback position, the depending portion 7b of the guide member 7 engages with the notch 20b in the clamp control member 20, whereby the groove 7a moves away from the folded tab 15a of the guided member 15 (see the exploded perspective view of FIG. 11 for detail). During the described operation, the motion control member 50 moves in the direction of the arrow Y, but because the pin 50b moves through the rectilinear portion of the cam edge 40a in the first lever 40 at this time, the first lever 40 does not rotate, thus allowing the playback base 9 to be positioned at its given playback position in a stable manner.

(e) Clamping Selected Disc

Figure 18A:
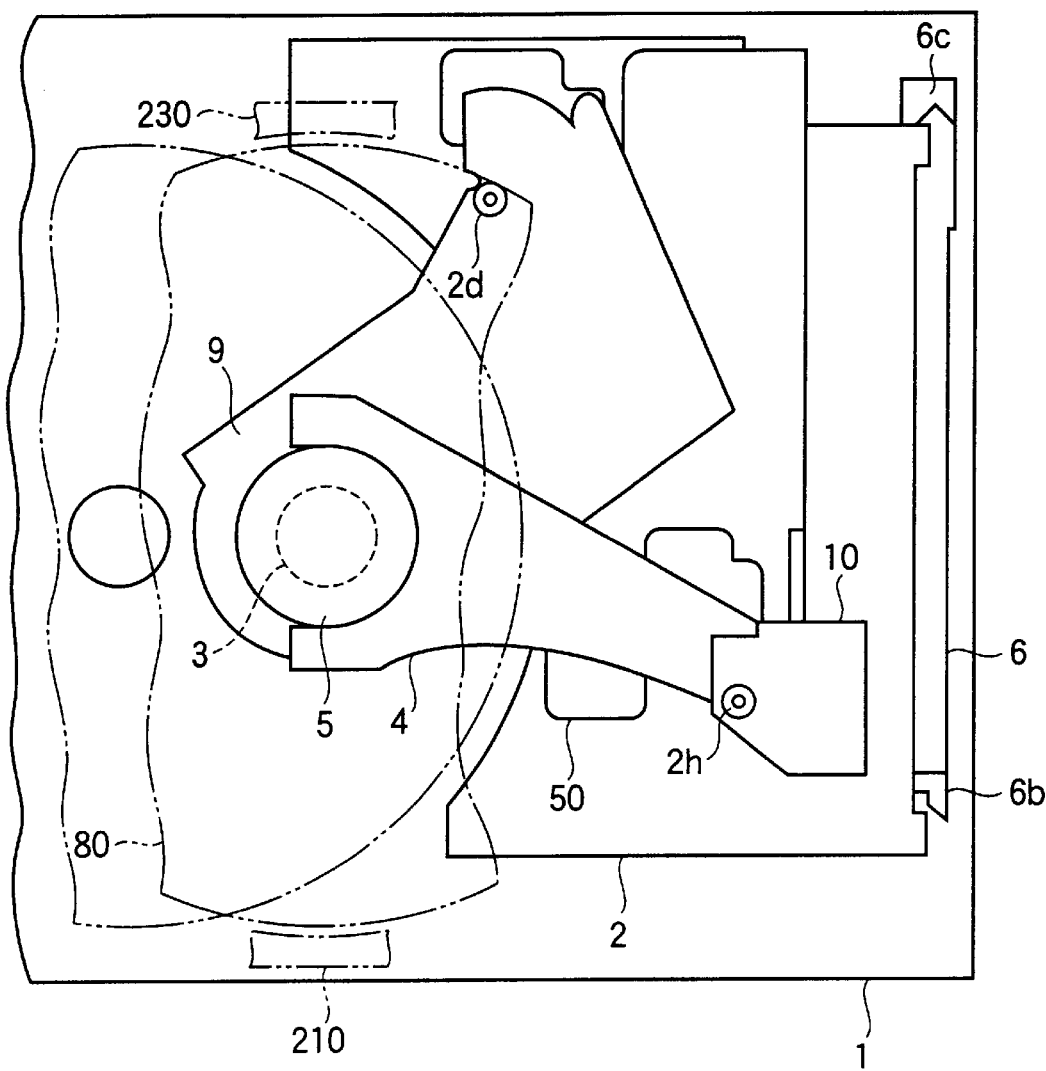
FIGS. 18A to 18C are a schematic plan view, a side view, and a detailed plan view of the disc player according to the first embodiment.
Figure 18B:
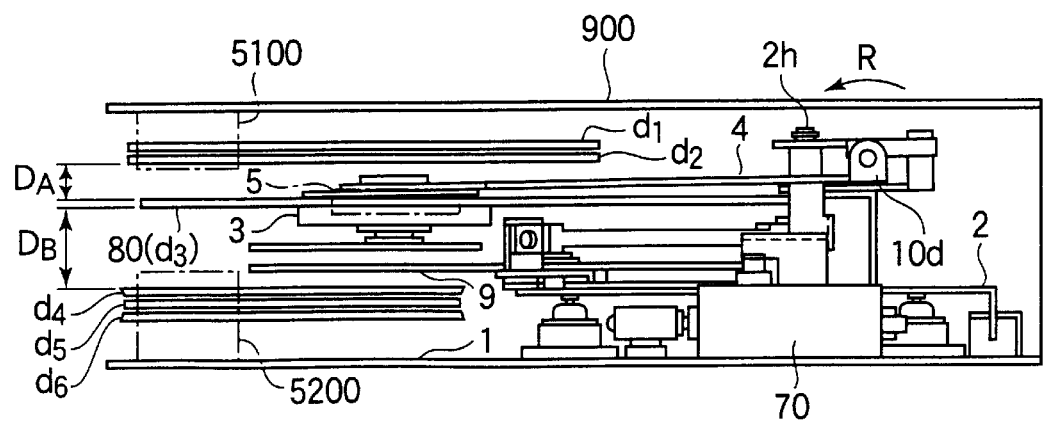
Figure 18C:
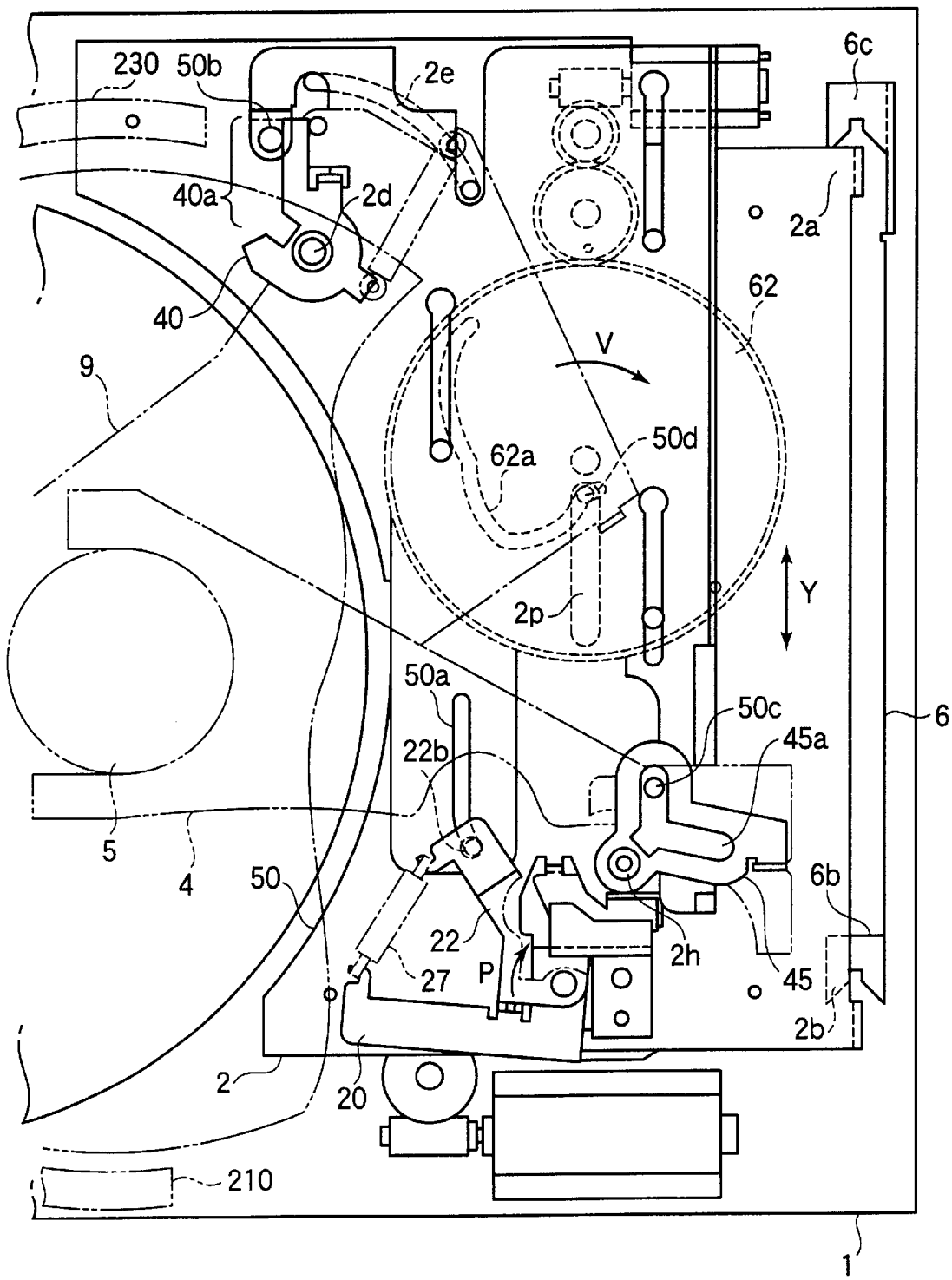

While the clamper 5 is conveyed to its playback position, the pin 50d moves toward the center of the first cam gear 62, whereby the motion control member 50 moves further in the direction of the arrow Y as shown in FIGS. 18A to 18C. As a consequence, the clamp drive member 22 rotates about the pole 2j in the direction of the arrow P as a result of the engagement of the pin 22b with the cam groove 50a in the motion control member 50, and the clamp control member 20 is similarly urged by the spring 27 to rotate about the pole 2j in the direction of the arrow P. At this time, the notch 20b in the clamp control member 20 presses against the depending portion 7b of the guide member 7, whereby the clamper arm 4 swings about the pole 12 in the direction of the arrow R. Further, the angle through which the clamp drive member 22 rotates is chosen to be slightly greater than the angle through which the clamp drive member 20 rotates, and accordingly, the clamp control member 20 is urged by the spring 27 to rotate in the direction of the arrow P, and the clamper arm 4 causes the selected disc 80 to be urged against the turntable 3 with a given clamping force and maintains it thus urged. Furthermore, as the motion control member 50 moves in the direction of the arrow Y, the pins 50b and 50c move through the rectilinear portion of the cam edge 40a in the first lever 40 and through the rectilinear portion of the cam groove 45a in the second lever 45, respectively, and accordingly, the levers 40 and 45 do not rotate while the playback base 9 and the clamper base 10 are maintained at their playback positions.

During an interval from the placement of the selected disc 80 on the turntable 3 to the clamping of the disc 80 by the clamper 5, the corresponding cam groove 700a in the cam gear 700 in the disc carrier mechanism shown in FIG. 13 represents an idling zone, and accordingly the lever 650 and mode switching member 600 do not operate, thus allowing the selected disc 80 to be positioned in a stable manner. Upon completion of the clamping operation, the idling zone of the cam groove 700a is terminated, and the mode switching member 600 again moves in the direction of the arrow X. This allows the hold drive plate 610 to move in the direction of the arrow Y', causing the hold lever 620 to rotate in the direction of the arrow Y. Such rotation is transmitted through the ring gear 530 to the gears 215, 225 and 235, whereby the carrier arms 210, 220 and 230 are rotated in the direction of the arrow β', thus moving away from the selected disc 80. Subsequently, the idling zone of the cam groove 120a shown in FIG. 11 is terminated, and the lock member 6 moves in the direction of the arrow Y. This allows the V-shaped pawls 6a, 6b and 6c on the lock member 6 to move away from the V-shaped pawls 2a, 2b and 2con the sub-base 2, thus unlocking the sub-base and allowing it to be supported in a floating manner on the base plate 1. Subsequently, the turntable 3 is rotated by the action of a spindle motor, thus initiating a playback operation from the selected disc 80. Further, the disc is removed from the turntable 3 by the described operations that are performed in a reverse sequence.

Second Embodiment

In the first embodiment, the playback section moving mechanism is driven by the first motor 60, while the sub-base 2 is unlocked and the disc carrier mechanism is driven by the second motor 70. However, in the second embodiment, these mechanisms are driven by the second motor 70 alone.

Figure 19:
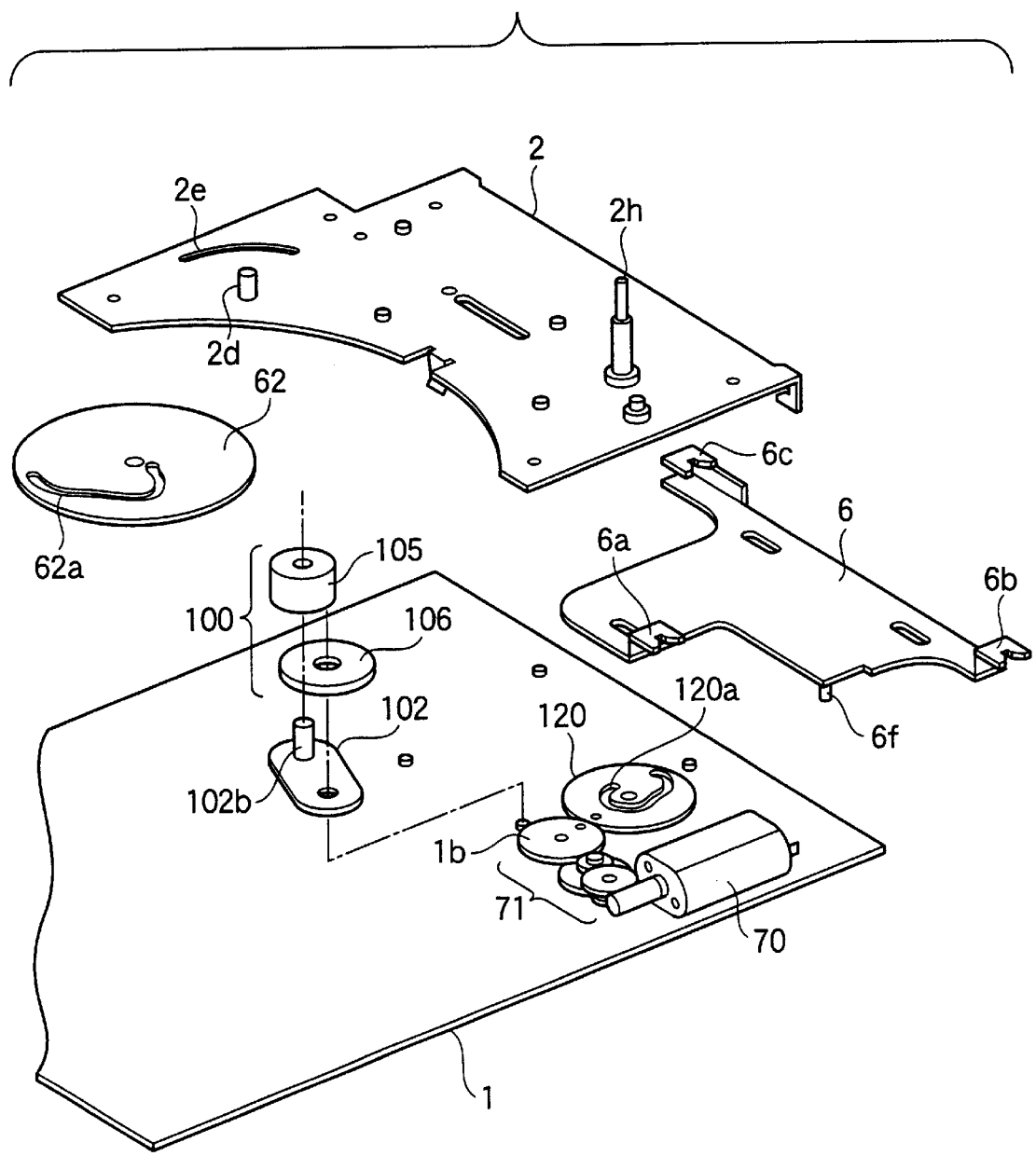
FIG. 19 is an exploded perspective view of a disc player according to the second embodiment of the present invention.
Figure 20A:
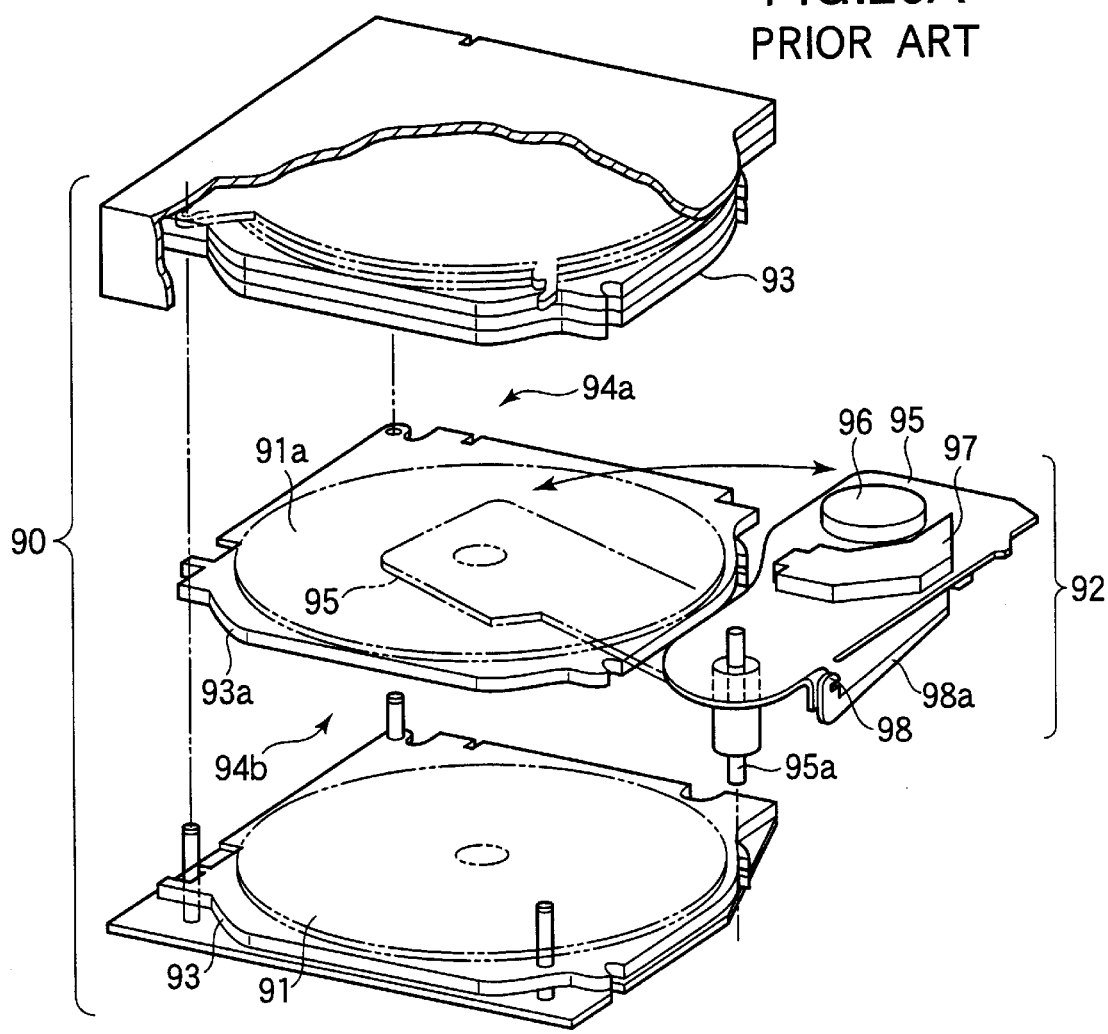
FIGS. 20A and 20B are respectively an exploded perspective view of a disc holding/separating section and a side view of a playback section in the prior art disc player.
Figure 20B:
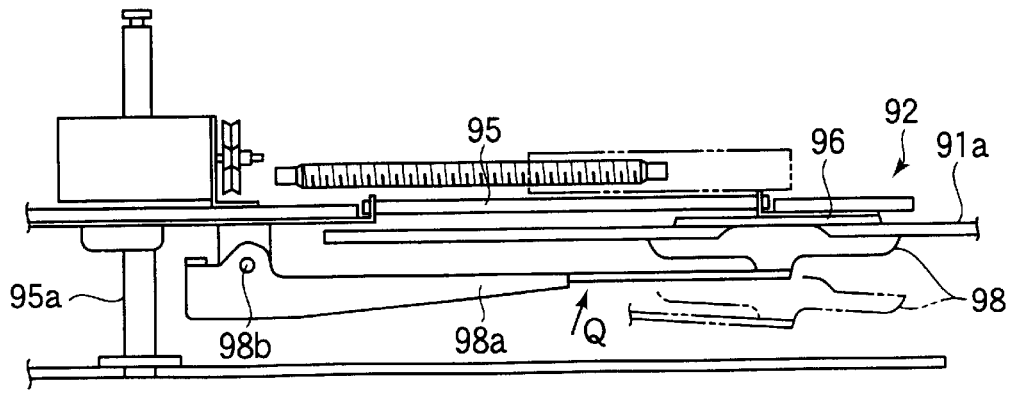

FIG. 19 is an exploded perspective view of a disc player according to the second embodiment of the present invention. In the second embodiment, clutch means is provided between a first cam gear 62 and a drive source. By controlling the clutch means, both conveying operation of the selected disc and moving operation of the playback section are performed in turn only by the single second motor 70. In FIG. 19, a lever 102 is rotatably mounted on a base plate 1 by means of a support pole 1b which is fixedly mounted thereon. A gear 105 which engages with the first cam gear 62 is rotatably mounted by a support pole 102b. A second gear 106 is rotatably mounted on the support pole 1b and meshes with a gear train 71 and a gear 105. The lever 102 disengages the first gear 105 from the first cam gear 62 except when a motion control member 50 is being driven. Means for transmitting a driving force to the first cam gear 62 which comprises the lever 102, the first gear 105 and the second gear 106 is referred to as clutch means 100.

The operation of the disc player according to the second embodiment will now be described.

When the second motor 70 begins driving a second cam gear 700 and a selected disc 80 is held between the carrier arms 210, 220 and 230 as shown in FIG. 14A, the lever 102 rotates to bring the first gear 105 into meshing engagement with the first cam gear 62, whereupon the driving force from the second motor 70 is transmitted to the first cam gear 62 through the clutch means 100.

When clamping the selected disc 80 is completed as indicated in FIGS. 18A to 18C, the clutch means 100 rotates about the support pole 1b to move away from the first cam gear 62. After the clutch means 100 is removed, the first cam gear 62 is locked by a lock member (not shown in the figures). In the second embodiment, the manner of conveying the playback section by driving the first cam gear 62 and the third cam gear 700 as well as the operation of holding the edges of the selected disc is performed in the similar manner as in the first embodiment. Further, the lever 102 can be driven by lever means (not shown), which engages with the mode switching means 600. By using the clutch means 100 to allow a plurality of conveying means to be driven from a single drive source, the total weight of the disc player can be reduced.

In the disc player according to the present invention, conveying the turntable and the conveying of the clamper are performed alternately, the turntable is conveyed into the space which is secured below a selected disc, and a clamper is conveyed into the space which is created when the selected disc is placed on the turntable. In this manner, the spaces into which the turntable and the clamper are to be conveyed can be reduced, thus allowing the size of the apparatus to be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A disc player which is capable of containing a plurality of discs and plays back a disc selected from said plurality of discs, comprising:

a disc holding/separating mechanism which holds said plurality of discs concentrically and which separates said selected disc from the remaining discs to form a first space below said selected disc;

a turntable;

a pickup which reads out data recorded on said selected disc which is placed on said turntable;

a turntable support mechanism which supports said turntable and which moves between an outside of said plurality of discs held by said disc holding/separating mechanism and said first space;

a disc carrier mechanism which holds and conveys said selected disc between said disc holding/separating mechanism and said turntable;

a clamper which secures said selected disc to said turntable;

a clamper support mechanism which supports said clamper and which moves between an outside of said plurality of discs held by said disc holding/separating mechanism and a second space formed above said selected disc which is placed on said turntable;

a control mechanism which controls motions of said turntable support mechanism and said clamper support mechanism;

wherein said turntable support mechanism and said clamper support mechanism are moved alternately as the first space is formed and the selected disc is conveyed onto the turntable, and then the second space is formed, respectively.

2. The disc player according to claim 1, wherein, when said selected disc is placed on said turntable, a center of said turntable is positioned off a central axis of said plurality of discs held by said disc holding/separating mechanism.

3. The disc player according to claim 1, wherein said pickup is mounted on said turntable support mechanism.

4. The disc player according to claim 1, further comprising a sub-base which supports said turntable support mechanism;

wherein said turntable support mechanism includes:

a first pole provided on said sub-base; and a playback base which is supported on said first pole so as to be rotatable about said first pole;

wherein said turntable is mounted on said playback base.

5. The disc player according to claim 4, wherein said pickup is mounted on said playback base.

6. The disc player according to claim 1, further comprising a sub-base which supports said clamper support mechanism;

wherein said clamper support mechanism includes:

a second pole provided on said sub-base; and a clamper arm which is supported on said second pole so as to be rotatable about said second pole;

wherein said clamper is mounted on said clamper arm.

7. The disc player according to claim 1, wherein said control mechanism includes:

a first motor;

a cam gear which has a cam groove and which is rotated by driving power supplied from said first motor; and a moving member which includes an engagement pin for engaging with said cam groove of said cam gear and which moves by driving power fed through said cam gear;

wherein both said turntable support mechanism and said clamper support mechanism engage with said moving member and moves in turn by driving power fed through said moving member.

8. A disc player which is capable of containing a plurality of discs and plays back a disc selected from said plurality of discs, comprising:

a disc holding/separating mechanism which holds said plurality of discs concentrically and which separates said selected disc from the remaining discs to form a first space below said selected disc;

a turntable;

a pickup which reads out data recorded on said selected disc which is placed on said turntable;

a turntable support mechanism which supports said turntable and which moves between an outside of said plurality of discs held by said disc holding/separating mechanism and said first space;

a disc carrier mechanism which holds and conveys said selected disc between said disc holding/separating mechanism and said turntable;

a clamper which secures said selected disc to said turntable;

a clamper support mechanism which supports said clamper and which moves between an outside of said plurality of discs held by said disc holding/separating mechanism and a second space formed above said selected disc which is placed on said turntable;

a control mechanism which controls motions of said turntable support mechanism and said clamper support mechanism;

wherein, when said selected disc is placed on said turntable, a center of said turntable is positioned on a central axis of said plurality of discs held by said disc holding/separating mechanism.

9. A disc player which is capable of containing a plurality of discs and plays back a disc selected from said plurality of discs, comprising:

a disc holding/separating mechanism which holds said plurality of discs concentrically and which separates said selected disc from the remaining discs to form a first space below said selected disc;

a turntable;

a pickup which reads out data recorded on said selected disc which is placed on said turntable;

a turntable support mechanism which supports said turntable and which moves between an outside of said plurality of discs held by said disc holding/separating mechanism and said first space;

a disc carrier mechanism which holds and conveys said selected disc between said disc holding/separating mechanism and said turntable;

a clamper which secures said selected disc to said turntable;

a clamper support mechanism which supports said clamper and which moves between an outside of said plurality of discs held by said disc holding/separating mechanism and a second space formed above said selected disc which is placed on said turntable;

a control mechanism which controls motions of said turntable support mechanism and said clamper support mechanism;

a base plate;

a sub-base which is supported on said base plate and which supports said turntable support mechanism and said clamper support mechanism;

a vibration absorbing member which is interposed between said base plate and said sub-base;

a lock member which is movably provided on said base plate and which is engaged with said sub-base when locking said sub-base in place;

and a lock member moving mechanism which causes said lock member to lock said sub-base until said clamper secures said selected disc to said turntable and which causes said lock member to unlock said sub-base when said clamper secures said selected disc to said turntable.

10. The disc player according to claim 9, further comprising a second motor;

wherein both said disc carrier mechanism and said lock member moving mechanism operate by driving power supplied from said second motor.

11. The disc player according to claim 10, wherein said control mechanism includes:

a clutch mechanism which is capable of transmitting driving power from said second motor;

a cam gear which has a cam groove and which is rotated by driving power supplied through said clutch mechanism from said second motor; and a moving member which includes an engagement pin for engaging with said cam groove of said cam gear and which moves by driving power fed through said cam gear;

wherein said turntable support mechanism and said clamper support mechanism engage with said moving member and moves in turn by driving power fed through said moving member.

12. A method of controlling a disc player comprising the steps of:

forming a first space below a disc selected from a plurality of discs which are concentrically held by a disc holding/separating mechanism of said disc player;

moving a turntable mounted on a turntable support mechanism of said disc player from an outside of said plurality of discs held by said disc holding/separating mechanism to said first space;

conveying said selected disc from said disc holding/separating mechanism onto said turntable by a disc carrier mechanism of said disc player;

alternately moving, after forming said first space and conveying the selected disc onto the turntable, a clamper supported on a clamper support mechanism of said disc player from an outside of said plurality of discs held by said disc holding/separating mechanism to a second space formed above said selected disc which is placed on said turntable;

securing said selected disc to said turntable by said clamper.

13. The method according to claim 12, further comprising the steps of:

raising said clamper from said selected disc which is placed on said turntable to said second space;

moving said clamper from said second space to the outside of said plurality of discs held by said disc holding/separating mechanism;

conveying said selected disc from said turntable to said disc holding/separating mechanism; and moving said turntable from said first space to the outside of said plurality of discs held by said disc holding/separating mechanism.

14. A disc player, comprising:

a holding device for holding a plurality of discs concentrically and separating a selected disc from rest of plurality of discs for playback;

a turntable for playing said selected disc; and a clamper for securing said selected disk onto said turntable for playback;

wherein said turntable and said clamper being moved alternately during playback as a first space being formed below the selected disc and said turntable being moved into the first space, and then a second space is formed above the selected disc, after the selected disc being conveyed onto the turntable, and the clamper being moved into the second space.

15. The disc player of claim 14, further comprising:

a locking device for reducing movement of the selected disc until said clamper being moved into the second space to secure the selected disc to the turntable.

16. A method for playing a disc, comprising:

separating a selected disc, from a of plurality of discs held concentrically, for playback by forming a first space below the selected disc;

moving a turntable into the first space for playing the selected disc;

alternately moving, after forming said first space and conveying the selected disc onto the turntable, a clamper into a second spaced formed above the selected disc for securing said selected disc onto the turntable for playback.

* * * * *